United States Patent
Divens-Dutcher et al.

(10) Patent No.: US 12,060,305 B2
(45) Date of Patent: Aug. 13, 2024

(54) CERAMIC HONEYCOMB BODIES HAVING HIGH-STRENGTH SKIN AND MANUFACTURING METHODS THEREOF

(71) Applicant: CORNING INCORPORATED, Corning, NY (US)

(72) Inventors: Adriane Marie Divens-Dutcher, Painted Post, NY (US); Patrick David Tepesch, Corning, NY (US); Elizabeth Marie Vileno, Corning, NY (US)

(73) Assignee: Corning Incorporated, Corning, NY (US)

( * ) Notice: Subject to any disclaimer, the term of this patent is extended or adjusted under 35 U.S.C. 154(b) by 572 days.

(21) Appl. No.: 17/256,886

(22) PCT Filed: Jun. 19, 2019

(86) PCT No.: PCT/US2019/037916
§ 371 (c)(1),
(2) Date: Dec. 29, 2020

(87) PCT Pub. No.: WO2020/005663
PCT Pub. Date: Jan. 2, 2020

(65) Prior Publication Data
US 2021/0355039 A1 Nov. 18, 2021

Related U.S. Application Data

(60) Provisional application No. 62/692,143, filed on Jun. 29, 2018.

(51) Int. Cl.
C04B 38/00 (2006.01)
C04B 35/46 (2006.01)
(Continued)

(52) U.S. Cl.
CPC ......... *C04B 38/0009* (2013.01); *C04B 35/46* (2013.01); *C04B 41/0072* (2013.01);
(Continued)

(58) Field of Classification Search
None
See application file for complete search history.

(56) References Cited

U.S. PATENT DOCUMENTS

| 4,298,328 A | 11/1981 | Frost |
| 4,349,329 A | 9/1982 | Naito et al. |

(Continued)

FOREIGN PATENT DOCUMENTS

| CN | 1509209 A | 6/2004 |
| CN | 101309883 A | 11/2008 |

(Continued)

OTHER PUBLICATIONS

International Search Report and Written Opinion of the International Searching Authority; PCT/US19/037916; Mailed Sep. 6, 2019; 10 Pages; European Patent Office.

(Continued)

*Primary Examiner* — Elizabeth Collister
(74) *Attorney, Agent, or Firm* — Kevin M. Able

(57) ABSTRACT

Methods of manufacturing a ceramic honeycomb body having a honeycomb structure with a matrix of intersecting walls, and a skin disposed on an outer peripheral portion of the matrix where the skin has a first average porosity and the interior portion of the matrix has a second average porosity that is greater than the first average porosity. The methods include coating at least the skin with a fluid formulation containing a sintering aid and subsequently firing the honeycomb structure. In certain embodiments, a glass layer is formed in the skin or in regions of the walls directly adjacent to the skin. In certain embodiments, the coating is applied to (Continued)

a green honeycomb structure, and in other embodiments the coating is applied to a ceramic honeycomb structure. Other honeycomb bodies and methods are described.

19 Claims, 12 Drawing Sheets

(51) Int. Cl.
*C04B 41/00* (2006.01)
*C04B 41/45* (2006.01)

(52) U.S. Cl.
CPC ...... *C04B 41/4543* (2013.01); *C04B 41/4578* (2013.01); *C04B 2235/5445* (2013.01); *C04B 2235/5454* (2013.01); *C04B 2235/6021* (2013.01); *C04B 2235/80* (2013.01)

(56) References Cited

U.S. PATENT DOCUMENTS

| | | | |
|---|---|---|---|
| 5,629,067 A | 5/1997 | Kotani et al. | |
| 6,077,483 A | 6/2000 | Locker et al. | |
| 7,138,003 B2 | 11/2006 | Ichikawa et al. | |
| 7,279,213 B2 | 10/2007 | Gulati et al. | |
| 7,618,699 B2 | 11/2009 | Beall et al. | |
| 7,704,296 B2 | 4/2010 | Merkel | |
| 7,727,613 B2 | 6/2010 | Suwabe et al. | |
| 7,883,759 B2 | 2/2011 | Takahashi | |
| 8,501,296 B2 | 8/2013 | Merkel | |
| 8,728,607 B2 | 5/2014 | Okazaki | |
| 9,840,444 B2 | 12/2017 | Okazaki | |
| 9,862,650 B2 | 1/2018 | Gunasekaran et al. | |
| 2004/0105956 A1 | 6/2004 | Ito et al. | |
| 2005/0106083 A1 | 5/2005 | Hirai et al. | |
| 2006/0210764 A1 | 9/2006 | Yamada et al. | |
| 2007/0178275 A1 | 8/2007 | Takahashi | |
| 2010/0009117 A1 | 1/2010 | Okazaki | |
| 2014/0147621 A1* | 5/2014 | Chapman | B01D 46/2462 428/116 |
| 2014/0338296 A1* | 11/2014 | Backhaus-Ricoult | C04B 35/62655 428/312.6 |
| 2015/0266782 A1 | 9/2015 | Gunasekaran et al. | |

FOREIGN PATENT DOCUMENTS

| | | |
|---|---|---|
| CN | 101495422 A | 7/2009 |
| CN | 101495423 A | 7/2009 |
| CN | 101573310 A | 11/2009 |
| CN | 101970377 A | 2/2011 |
| CN | 102007088 A | 4/2011 |
| CN | 103889929 A | 6/2014 |
| CN | 106458772 A | 2/2017 |
| EP | 0554104 A2 | 8/1993 |
| EP | 1533032 A1 | 5/2005 |
| EP | 2767527 A1 | 8/2014 |
| JP | 2613729 B2 | 5/1997 |
| JP | 2004-075523 A | 3/2004 |
| JP | 2009-226350 A | 10/2009 |
| JP | 2016-069218 A | 5/2016 |
| JP | 2017-515773 A | 6/2017 |
| WO | 2007/086183 A1 | 8/2007 |
| WO | 2008/078748 A1 | 7/2008 |
| WO | 2013/054793 A1 | 4/2013 |
| WO | 2020/005665 A1 | 1/2020 |

OTHER PUBLICATIONS

Japanese Patent Application No. 2020-572511, Office Action, dated Apr. 5, 2022, 8 pages (4 pages of English Translation and 4 pages of Original Copy); Japanese Patent Office.

Chinese Patent Application No. 201980043709.0, Office Action dated Mar. 24, 2022, 05 pages (English Translation Only), Chinese Patent Office.

* cited by examiner

CERAMIC HONEYCOMB BODIES HAVING HIGH-STRENGTH SKIN AND MANUFACTURING METHODS THEREOF

This is a national stage application under 35 U.S.C. § 371 of International Application No. PCT/US2019/037916, filed Jun. 19, 2019, which claims the benefit of priority under 35 U.S.C. § 119 of U.S. Provisional Application Ser. No. 62/692,143 filed on Jun. 29, 2018, the content of which are incorporated herein by reference in their entireties.

FIELD

The present disclosure relates to ceramic honeycomb bodies having increased isostatic strength and methods of manufacturing of such ceramic honeycomb bodies.

BACKGROUND

Ceramic honeycomb bodies comprising honeycomb structures have been used in applications such as in automotive exhaust after-treatment systems. For example, the ceramic honeycomb bodies can provide a substrate for catalytic converters or, when plugged, for particulate filters.

Ceramic bodies of a honeycomb shape have been manufactured by preparing a honeycomb green body through mixing of inorganic materials with a liquid vehicle, extrusion aids, and optionally a pore-former to form a plasticized batch mixture, forming the batch mixture into a honeycomb green body through extrusion of the batch mixture, and drying and firing the honeycomb green body in a furnace to produce a fired ceramic honeycomb body. The honeycomb body can include a peripheral skin. Some of the channels of the ceramic honeycomb structure can be plugged to form a plugged honeycomb body.

The ceramic honeycomb body can be combined with a housing (e.g., a can) to provide an assembly that is suitable for use in a vehicular exhaust after-treatment system, for example.

SUMMARY

A ceramic honeycomb body is disclosed herein comprising increased isostatic strength.

In some example embodiments of this disclosure, a ceramic honeycomb body is disclosed comprising a first average porosity in the skin, and a second average porosity in an interior portion of the matrix that is greater than the first average porosity in the skin.

In some example embodiments of this disclosure, a ceramic honeycomb body is provided. Starting with a green honeycomb body comprising a honeycomb structure with a matrix of intersecting walls and a skin adjacent to an outer peripheral region of the matrix, at least the skin is coated with a slurry, or solution, that comprises a sintering aid. The coated green honeycomb body is subsequently fired, resulting in a ceramic honeycomb body comprising a first average porosity in the skin, and a second average porosity in an interior portion of the matrix that is greater than the first average porosity in the skin.

In some example embodiments of this disclosure, a ceramic honeycomb body is provided. The ceramic honeycomb body comprises a honeycomb structure with a matrix of intersecting walls and a skin adjacent to an outer peripheral region of the matrix, wherein at least the ceramic skin is coated, with a slurry, or solution, that comprises a sintering aid. The coated ceramic honeycomb body is subsequently re-fired, resulting in a ceramic honeycomb body comprising a first average porosity in the ceramic skin and second average porosity in an interior portion of the matrix, wherein the second average porosity is greater than the first average porosity.

Further, in some example embodiments of this disclosure, a ceramic honeycomb body including a glass phase is provided. The ceramic honeycomb body comprises a honeycomb structure with a matrix of intersecting walls, and a skin disposed adjacent to an outer periphery of the matrix of intersecting walls, and a glass phase distributed in the skin. In certain embodiments, the skin has an inner portion and an outer portion, and the glass phase is distributed in the outer portion of the skin in first average volume percentage and in the inner portion in a second average volume percentage, wherein the second average volume percentage is less than the first average volume percentage. In certain embodiments, the glass phase is provided as a layer in the skin.

In further example embodiments of this disclosure, a ceramic honeycomb body is provided. The ceramic honeycomb body comprises honeycomb structure with a matrix of intersecting walls, and a skin disposed adjacent to an outer periphery of the matrix of intersecting walls, wherein the skin has an inner portion and an outer portion. A crystalline titania (rutile) phase is distributed in the outer portion of the skin in a first volume percentage, and the crystalline titania (rutile) phase is distributed within the inner portion of the skin in a second volume percentage, wherein the second volume percentage is less than the first volume percentage.

Numerous other features and aspects are provided in accordance with these and other embodiments of the disclosure. Further features and aspects of embodiments will become more fully apparent from the following detailed description, the claims, and the accompanying drawings.

BRIEF DESCRIPTION OF THE DRAWINGS

The accompanying drawings, described below, are for illustrative purposes and are not necessarily drawn to scale. The drawings are not intended to limit the scope of the disclosure in any way. Like numerals are used throughout the specification and drawings to denote like elements.

DETAILED DESCRIPTION

Figure 1A:
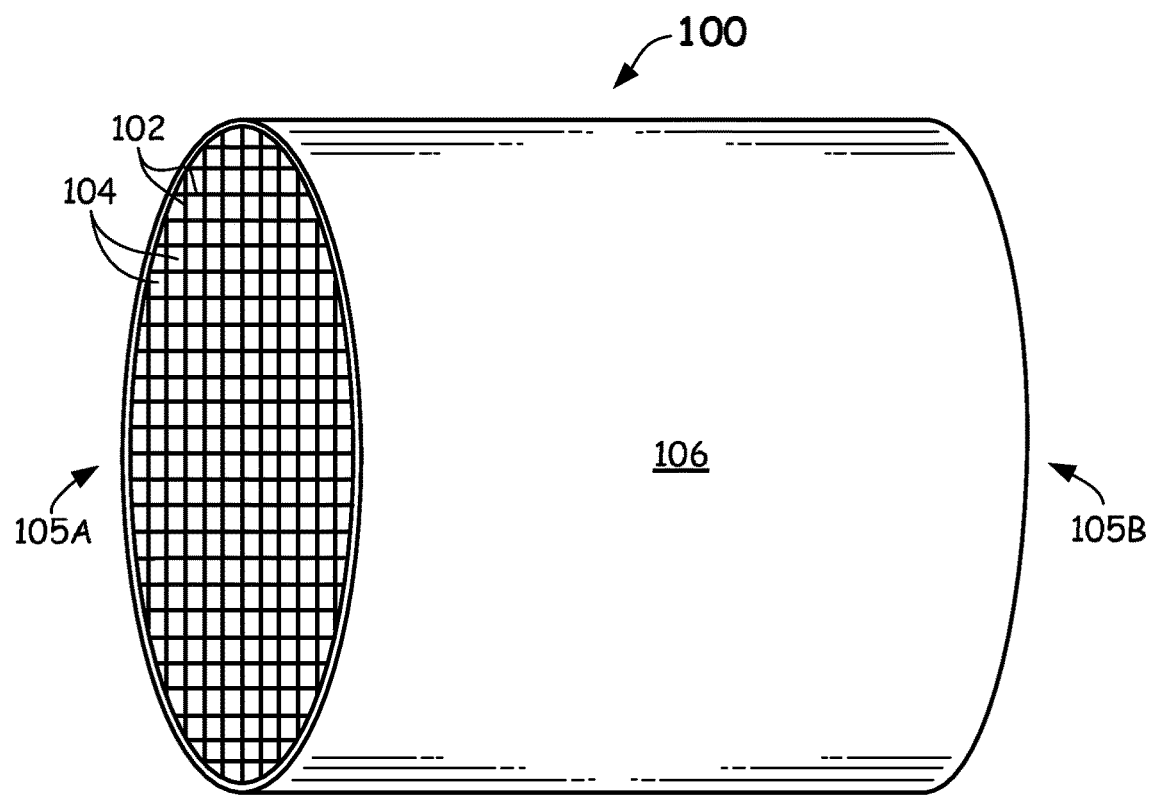
FIG. 1A schematically illustrates a perspective view of an example ceramic honeycomb body having an outer portion with a first average porosity, and an interior portion with a second average porosity that is greater than the first average porosity in accordance with this disclosure.

Reference will now be made in detail to the example embodiments of this disclosure, which are illustrated in the accompanying drawings. In describing the embodiments, numerous specific details are set forth in order to provide a thorough understanding of the disclosure. However, it will be apparent to a person of skill in the art that embodiments of the disclosure may be practiced without some or all of these specific details. In other instances, well-known features and/or process steps have not been described in detail so as not to obscure the embodiments of the disclosure. Features of the various embodiments described herein may be combined with each other, unless specifically noted otherwise.

The materials, components, and assemblies described herein as making up the various embodiments are intended to be illustrative and not restrictive. Many suitable materials and components that can perform the same or a substantially similar function as the materials and components described herein are intended to be embraced within the scope of embodiments of the present disclosure.

Various embodiments in accordance with this disclosure relate to a ceramic honeycomb body comprising a ceramic honeycomb structure suitable for use in the processing and treatment of automotive exhaust gases. A ceramic honeycomb body may be configured for use in a catalytic converter, that is, it may be used as a substrate for deposit of a washcoat of ceramic particulate materials including one or more catalyst materials therein. For example, the catalyst material used may comprise one or more metals such as platinum, palladium, rhodium, combinations, and the like. These one or more metals can catalyze at least one reaction between various components of the exhaust stream, such as of an exhaust stream from an internal combustion engine exhaust (e.g., automotive engine or diesel engine). Other metals can be added such as nickel and manganese to bock sulfur absorption by the washcoat. A catalyzed reaction can include the oxidation of carbon monoxide to carbon dioxide, for example. Other catalyzed reactions can include reduction of sulfur (SOx). Modern three-way catalytic converters can also reduce oxides of nitrogen (NOx) to nitrogen and oxygen. Additionally, a catalytic converter including a ceramic honeycomb body may facilitate the oxidation of hydrocarbons to carbon dioxide and water.

Treatment of exhaust gas from internal combustion engines can be enhanced by the use of catalysts supported on high-surface area substrates. In the case of diesel engines and some gasoline direct injection engines, a catalyzed or uncatalyzed plugged ceramic honeycomb body can be used in a particulate filter for the removal of particles. Plugged ceramic honeycomb bodies and high-surface area, flow-through ceramic honeycomb catalyst supports in these applications can be refractory, thermally shock resistant, stable under a wide range of $pO_2$ conditions, non-reactive with the catalyst system, and offer low resistance to exhaust gas flow. Such ceramic honeycomb catalyst supports and plugged honeycomb bodies (e.g., plugged wall-flow honeycomb bodies), referred to herein as "ceramic honeycomb bodies," may be used in these applications.

A ceramic honeycomb body comprises a honeycomb structure with an intersecting matrix of walls of a suitably porous material (e.g., a porous ceramic). The catalytic material(s) can be suspended in a washcoat of inorganic particulates and a liquid vehicle, and then applied to the walls of the honeycomb body, such as by coating. Thereafter, the coated ceramic honeycomb body may be further processed, wrapped with a cushioning material and received in a can (or housing) via a canning process.

As part of this canning process, the ceramic honeycomb body and honeycomb structure thereof may be subjected to appreciable isostatic (ISO) compression stresses. In ceramic honeycomb bodies, these ISO stresses can, in some instances, cause fracture of the porous walls and skin thereof. Thus, manufacturing methods that provide ceramic honeycomb bodies with greater ISO strength may provide certain advantages in terms of less wall and skin fracture, e.g., during handling, testing, and/or canning.

In accordance with one or more embodiments of this disclosure, a ceramic honeycomb body is provided with increased ISO strength. The ISO strength may be increased as much as 10% or more, 20% or more, 30% or more, or even 40% or more, as compared to the ISO strength of a comparable conventionally-manufactured ceramic honeycomb body. Moreover, horizontal stamping strength (HS) may be improved.

Such improved ceramic honeycomb bodies can result in fewer fractures from canning pressures and ISO stresses subjected to the ceramic honeycomb bodies. In certain embodiments, this improved strength can be due to the provision of (e.g., distribution of) a glass phase in the skin of the ceramic honeycomb body. In certain embodiments, an outer portion of the skin comprises a glass phase therein. Further, in certain embodiments, the glass phase may be presented as a layer within the skin. In particular, the glass phase may be provided more predominantly in an outer portion of the skin than in an inner portion of the skin.

In a method embodiment, a green body can be formed from a batch mixture, for example, a ceramic-forming batch composition, including ceramic-forming materials that may include ceramics or ceramic precursors sources, or both, a liquid vehicle, rheology modifiers, an optional pore former material, and the like. When fired, the ceramic-forming batch mixture is transformed by sintering into a porous ceramic material, for example, a porous ceramic honeycomb body suitable for exhaust after-treatment purposes. The ceramic material may comprise any suitable crystalline structure such as, for example, cordierite, aluminum titanate, aluminum titanate magnesium titanate solid solution, alumina, mullite, feldspar, silicon carbide, silicon nitride, and the like, and combinations thereof.

A green honeycomb body can be initially formed by an extrusion method where a ceramic-forming batch mixture is extruded from an extrusion die into a green honeycomb body, dried, and fired to form the ceramic honeycomb body comprising a honeycomb structure with enhanced strength. The extrusion can be performed using a hydraulic ram extrusion press, a two stage de-airing single auger extruder, or a twin-screw extruder with an extrusion die attached to the discharge end. A skin may be formed on the honeycomb body during the extrusion. Other suitable extruders can be used.

Honeycomb extrusion dies employed to produce such green honeycomb bodies can be multi-component assemblies including, for example, a wall-forming die body combined with a skin-forming mask. For example, U.S. Pat. Nos. 4,349,329 and 4,298,328 disclose suitable die structures including skin-forming masks. Other suitable dies may be used. The die body may incorporate batch feedholes leading to, and intersecting with, an array of discharge slots formed in the die face, through which the batch mixture is extruded. The extrusion process forms an interconnecting matrix of intersecting walls forming a central honeycomb structure. A mask can be employed at a skin-forming region of the extrusion die to form the skin at the outer peripheral portion of the matrix. The skin can be thicker than the walls. The mask can be a ring-like circumferential structure, such as in the form of a collar, defining the peripheral geometry of the skin of the green honeycomb body. The circumferential layer of skin of the green honeycomb body can be formed at the same time as the central honeycomb structure by extruding the batch mixture through the die.

The extruded honeycomb body, referred to as an extrudate, can be extruded as a log and cut to create green honeycomb bodies having suitable length to meet the specifications of engine manufacturers. The green honeycomb body can alternatively be in the form of a honeycomb segment, which can be fired and bonded together with other segments to form the final ceramic honeycomb body. These honeycomb segments and resulting honeycomb bodies can have any suitable size or shape.

As clean air regulations become more stringent, ceramic honeycomb bodies for automotive exhaust gas treatment have correspondingly changed to have thinner walls and higher porosity. Although providing ceramic honeycomb products having thinner walls and higher porosity may improve their functionality with respect to treating exhaust gases, these changes can also reduce a mechanical strength of the ceramic honeycomb bodies. This reduction in mechanical strength can reduce the ability of the ceramic honeycomb body to withstand ISO stresses, e.g., during handling, processing, and canning.

In the past, features such as halo (i.e., providing radially outer walls directly adjacent to the skin that are thicker than the interior walls) have been used to increase the strength of the ceramic honeycomb structures. Furthermore, radiusing of the corners of the channels may also be used to enhance ISO strength. In addition, closer control of the distortion of the outer walls can help achieve adequate mechanical strength. However, even employing these features, higher porosity honeycomb bodies can have a difficult time withstanding the isostatic pressure used in the manufacturing process (e.g., during canning) and/or to perform successfully in an automotive exhaust treatment application without cracking.

It has been found by the inventors that the fractures due to isostatic pressure occurring at the lowest pressure happen at or very close to the skin of conventional ceramic honeycomb bodies. The inventors have found that by increasing the average isostatic strength of the skin and possibly also the walls directly adjacent to the skin of such ceramic honeycomb bodies, such isostatic-pressure induced cracking may be reduced, or even prevented.

Figure 12:
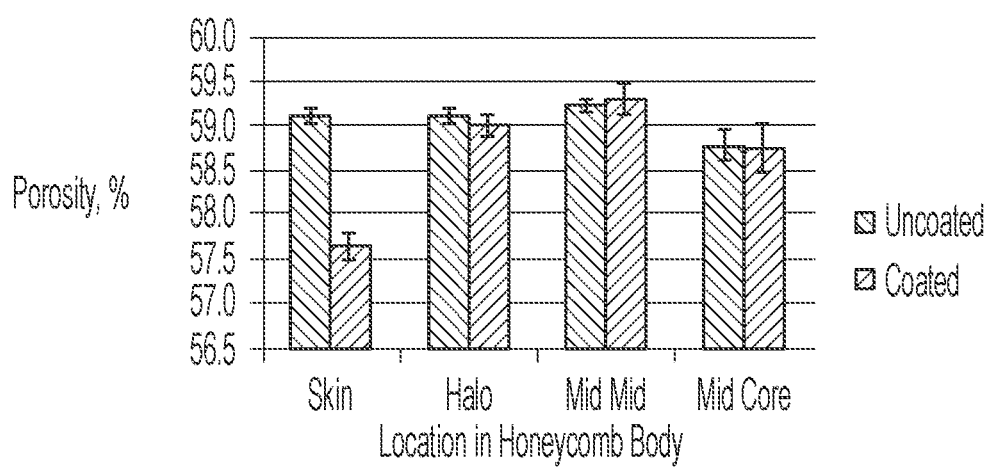
FIG. 12 illustrates a plot of porosity (%) of various portions (skin, halo, mid, and center) of a ceramic honeycomb body prepared with an application of a skin coating comprising a sintering aid and also without application of a skin coating comprising a sintering aid in accordance with this disclosure.

In order to increase the isostatic strength of a ceramic honeycomb structure, the skin, and possibly the walls directly adjacent to the skin, may be strengthened by reducing the porosity thereof. Various embodiments in accordance with this disclosure may have a first average porosity in the skin and a second average porosity throughout an interior (e.g., middle) portion of the ceramic honeycomb structure, wherein first average porosity can be less than the second average porosity of the interior portion of the ceramic honeycomb body. Wall regions directly adjacent to the skin can also have reduced porosity as compared to the interior portion. For example, the average porosity in the skin may be less than an average porosity of the interior portion by a difference of about 1% or more. In certain embodiments, the average porosity in the wall regions directly adjacent to the skin may be less than an average porosity of the interior portion. In other embodiments, ceramic honeycomb bodies can have a difference in average porosity between the skin and the interior portion of the matrix of the ceramic body is 3% or less, for example a difference of an average porosity in the skin of less than 3% of an average porosity of the interior portion of the ceramic honeycomb body. In still further embodiments, a difference in average porosity between the skin and the interior portion of the matrix of the ceramic body is 5% or less, for example a ceramic honeycomb bodies may have a porosity in the skin of less than or equal to 5% of an average porosity of an interior portion of the ceramic honeycomb structure. However, higher reductions (e.g., greater than 5%) in certain embodiments may not be desired or needed and might be avoided due to thermal shock performance restrictions, i.e., cracking. Average porosity as used herein means average bulk porosity as measured by mercury porosimetry. FIG. 12 illustrates the relative porosity of various portions of the honeycomb body including the application of a skin coating comprising a sintering aid versus without the coating. As can be seen, the porosity of the skin can be lowered significantly as compared to the interior portion (Mid Core or Center) and Mid Mid portion between the skin and the Mid Core, and even as compared to a halo region (Halo) i.e. an annular region having peripherally strengthened or thickened peripheral matrix walls.

Figure 8:
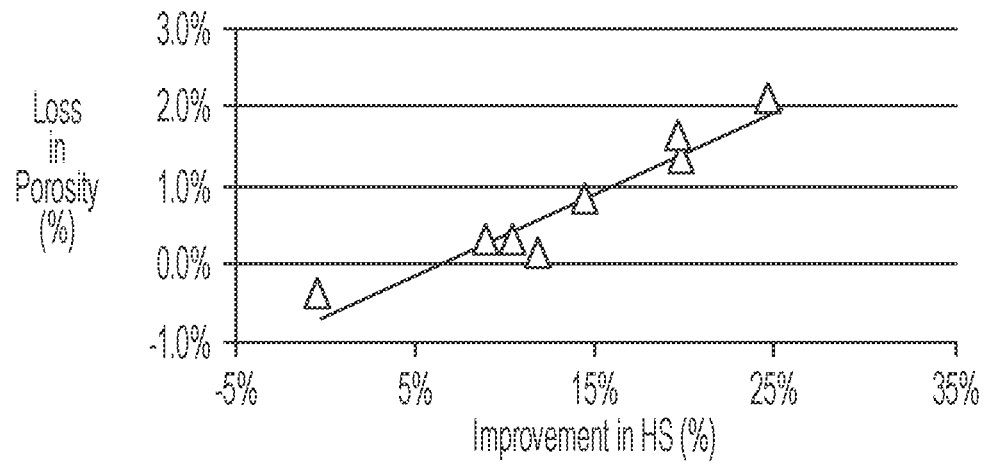
FIG. 8 illustrates a plot of loss in porosity (%) of the skin versus improvement is horizontal stamping strength (%) of a ceramic honeycomb body prepared with an application of a skin coating comprising a sintering aid in accordance with this disclosure.

FIG. 8 illustrates the effect on horizontal stamping (HS) strength as a function of reduced porosity (vol. %) of the skin. Horizontal stamping (HS) is a test performed where the honeycomb body is loaded on the sides until fracture occurs. A small change (i.e. difference) in average porosity %, for example as little as 1% loss, can increase HS strength by 5% or more, or even over 8% or more. A 2% lowering of the porosity of the skin can result in an increase in HS strength by 15% or more.

In certain embodiments, a reduction in the porosity of the skin, and possibly also in wall regions directly adjacent to the skin, of a ceramic honeycomb body can be a contributing factor in increasing the ISO strength in the skin area. Another contributing factor in increasing the ISO strength in the skin area in certain embodiments can be the introduction of a glass phase in the skin, and further optionally also in wall regions directly adjacent to the skin. In certain embodiments, a substantial glass phase layer is present in the skin. In certain embodiments, the glass layer is present in an outer portion of the skin.

An increase in ISO strength can be imparted by the reduction of porosity in the skin and therefore can increase the pressure at which the ceramic honeycomb structure fractures under isostatic pressure. Moreover, formation of a glass phase in the skin can further enhance the ISO strength of the skin and thus of the ceramic honeycomb body. By increasing the threshold pressure at which the ceramic honeycomb body fractures, manufacturing yields may advantageously be increased.

In order to achieve the porosity reduction and/or form a glass phase in the skin, and in certain embodiments in portions of the walls directly adjacent to the skin, a sintering aid is applied at least to the skin of the honeycomb body. Subsequently, the honeycomb body is subjected to a firing cycle. In certain embodiments, the sintering aid may be applied to a green honeycomb body. In other embodiments, the sintering aid may be applied to a previously-fired ceramic honeycomb body, and the ceramic honeycomb body having the applied sintering aid is re-fired. During firing (or re-firing), the skin, and in certain embodiments, portions of the walls directly adjacent to the skin, sinter more than the interior portions of the walls. This results in lower porosity at the skin, and/or a glass phase being formed in the skin, and in certain embodiments, depending on the skin thickness, porosity, coating composition and/or coating method, possibly portions of the walls directly adjacent to the skin.

The resultant ceramic honeycomb body comprises a different chemistry and phase composition in the skin, and possibly in the wall regions directly adjacent to the skin, than in the interior portion of the walls. Various methods in accordance with this disclosure can provide ceramic honeycomb bodies with lower porosity in the skin than in the interior walls, substantially without fissures in, or damage to, the skin. In addition, by filling in the skin with a heavily-loaded sintering aid, the porosity may be decreased by adding relatively more material at the skin than is present throughout the interior walls of the interior portion of the ceramic honeycomb body.

A reduction in the porosity and/or introduction of the glass phase in the skin, and possibly in wall regions directly adjacent to the skin, significantly increases the ISO strength in the skin area. This can increase the pressure at which the ceramic honeycomb structure fractures under isostatic pressure. These advantages provided by the coating methods and firing cycles disclosed herein apply to a variety of ceramic honeycomb bodies including, but not limited to, aluminum titanate-feldspar ceramic honeycomb bodies, cordierite ceramic honeycomb bodies, aluminum-titanate-cordierite honeycomb bodies, as well as other ceramic honeycomb bodies.

Additional potential benefits of the low porosity skin and skin including a glass phase, and especially a glass phase layer, can comprise preventing bleed through of catalyst-containing coatings, better chip resistance for the ceramic honeycomb bodies, and/or better handling response.

Figure 1B:
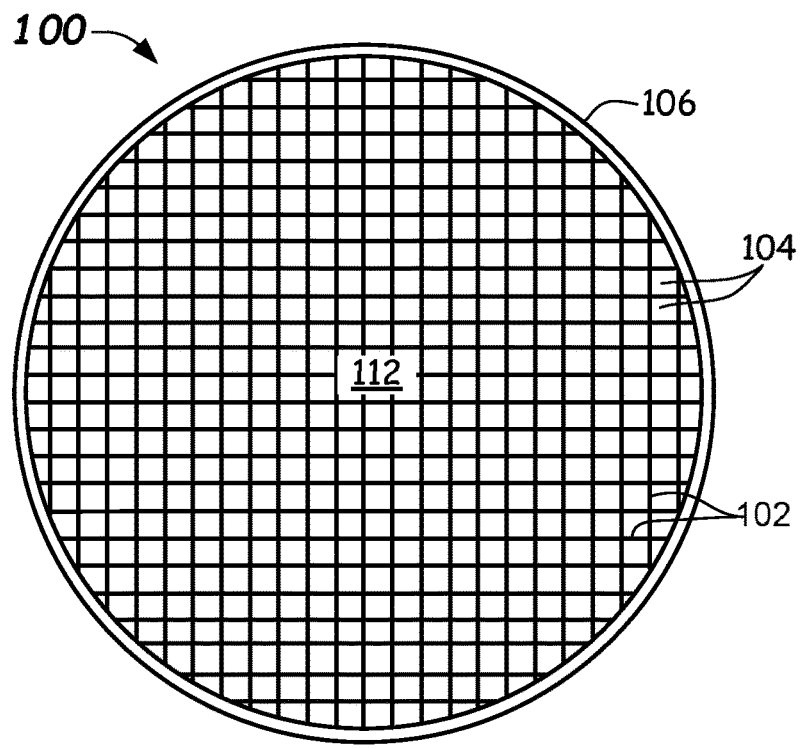
FIG. 1B schematically illustrates an end plan view of an example ceramic honeycomb body having an outer portion with a first average porosity, and an interior portion with a second average porosity that is greater than the first average porosity in accordance with this disclosure.

FIGS. 1A and 1B illustrate an example ceramic honeycomb body 100 in accordance with certain embodiments of this disclosure. Ceramic honeycomb body 100 comprises a honeycomb structure comprising a matrix of a plurality of intersecting walls 102 that form channels 104, which extend longitudinally from a first end 105A to a second end 105B. Channels 104 may be formed by orthogonally intersecting walls 102 (as shown) in certain embodiments. A skin 106 can be disposed on an outer peripheral region of the matrix of intersecting walls 102. A rectangular (e.g., square) cross-sectional channel shape in transverse cross-section is shown. However other cross-sectional channel shapes in transverse cross-section may be used, such as rectangular (non-square), hexagonal, octagonal, diamond, triangular, and combinations thereof.

Figure 1C:
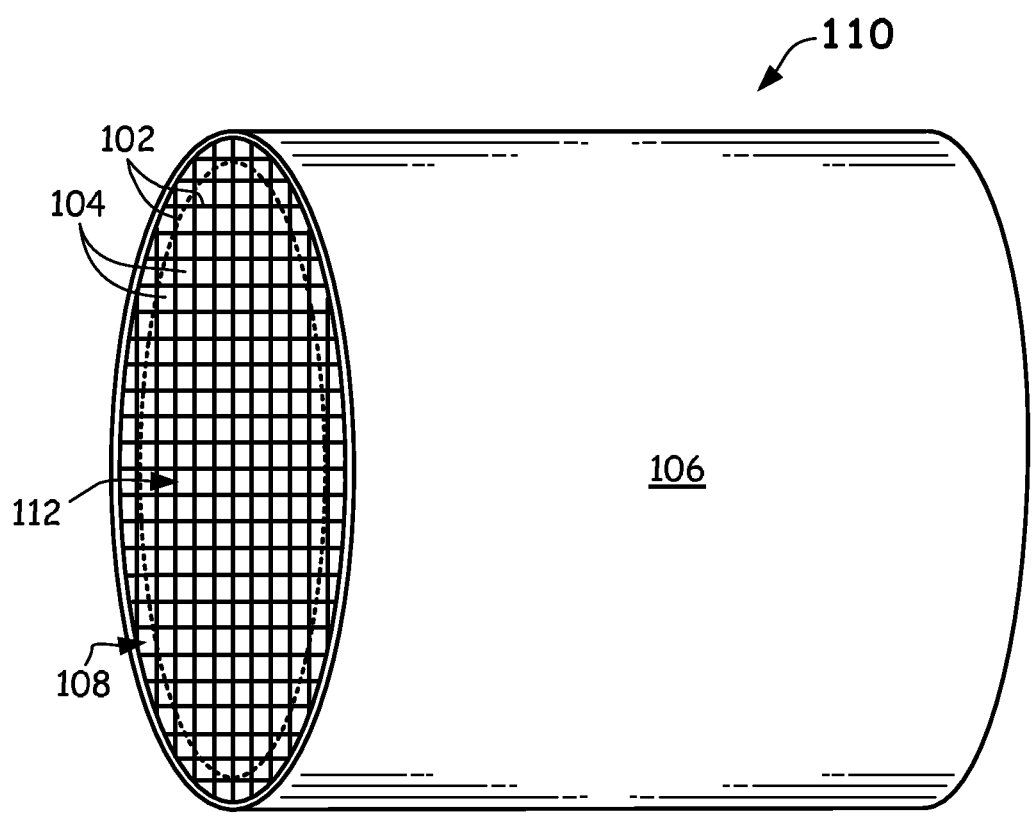
FIG. 1C schematically illustrates a perspective view of an example ceramic honeycomb structure having an outer portion with a first average porosity, an interior portion with a second average porosity that is greater than the first average porosity, and a halo portion disposed between the outer portion and the interior portion, in accordance with this disclosure.
Figure 1D:
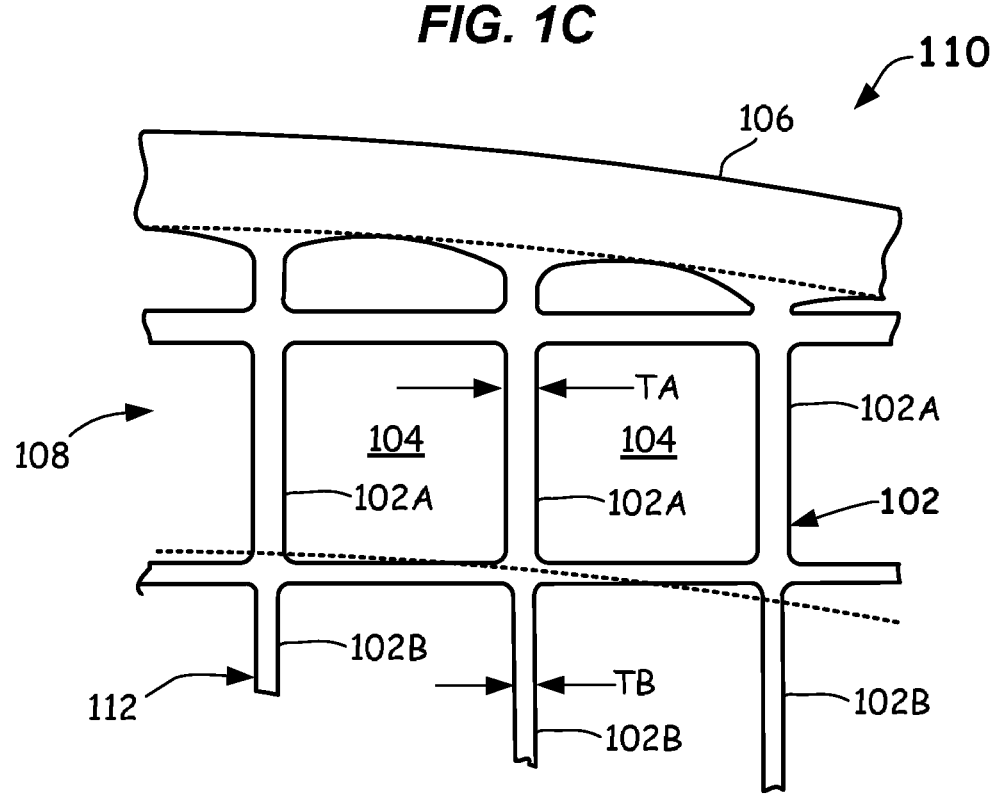
FIG. 1D schematically illustrates a partial end view an example ceramic honeycomb structure having an outer portion with a first average porosity, an interior portion with a second average porosity that is greater than the first porosity, and a halo portion disposed between the outer portion and the interior portion, in accordance with this disclosure.
Figure 1E:
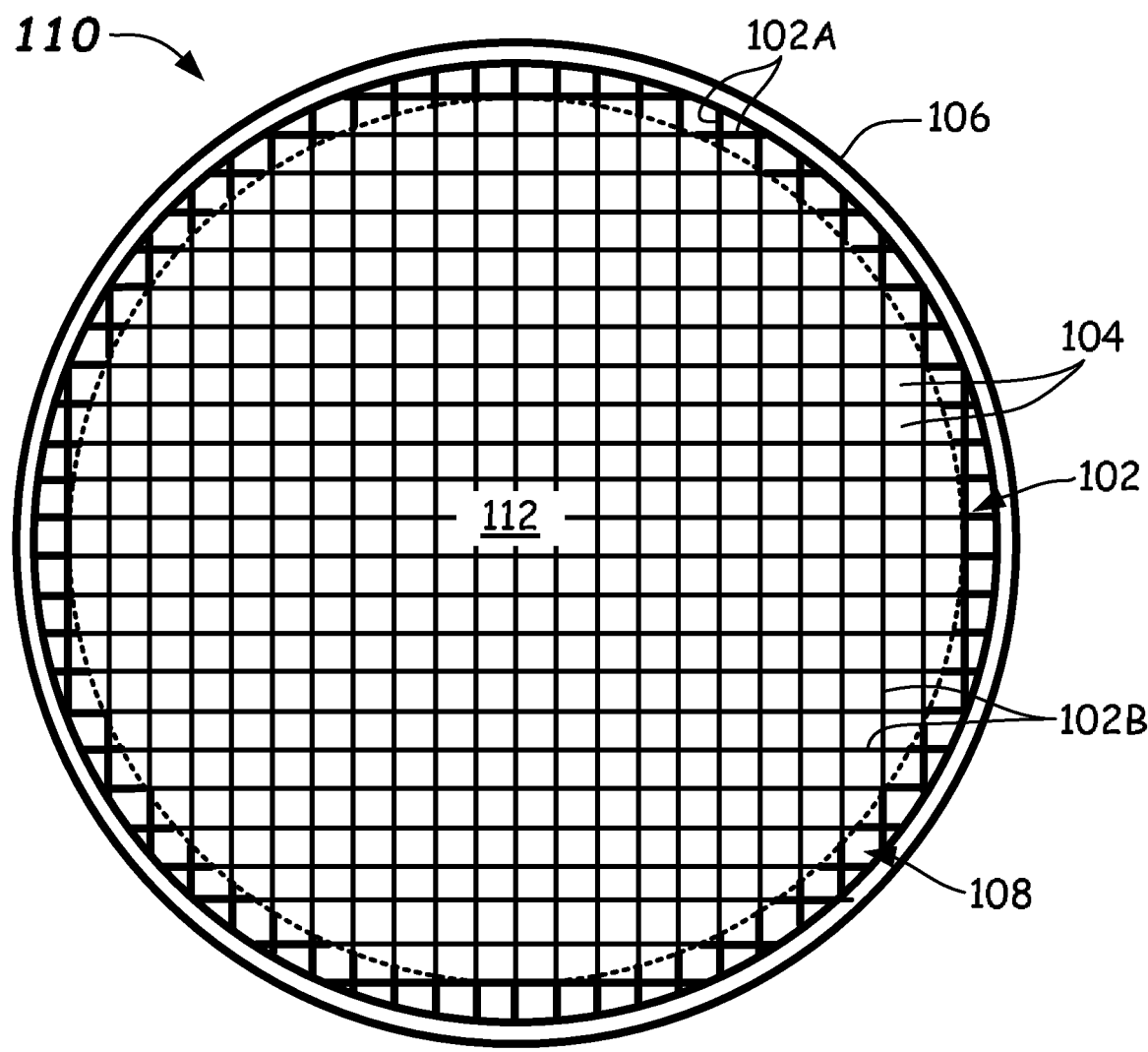
FIG. 1E schematically illustrates an end view of an example ceramic honeycomb structure having an outer portion with a first average porosity, an interior portion with a second average porosity that is greater than the first average porosity, and a halo portion disposed between the outer portion and the interior portion, in accordance with this disclosure.

FIGS. 1C through 1E illustrate an example ceramic honeycomb body 110 in accordance with certain embodiments of this disclosure. Ceramic honeycomb body 110 is similar to ceramic honeycomb body 100 in that it has a matrix made of a plurality of intersecting walls 102 (e.g., orthogonally-intersecting), that form channels 104 extending along the longitudinal length of the honeycomb body 100, and a skin 106 that is disposed on an outer peripheral region of the intersecting walls 102. However, ceramic honeycomb body 110 further includes a halo region 108 disposed between skin 106 and an interior portion 112 of the matrix and located directly adjacent to the skin 106. The halo region 108 can be a ring-shaped region of thick walls 102A that can be thicker in transverse thickness than thin walls 102B in interior portions 112 of the matrix that are disposed interior to halo region 108. The halo region 108 can, for example, extend a few channel widths inwardly from the inside surface of the skin 106 (e.g., 1-3 channel widths). Additionally, halo region 108 can comprise corner radiuses within the channels 104 therein.

Although example ceramic honeycomb bodies 100, 110 are shown as cylindrical structures, alternative embodiments of this disclosure may be implemented with any other suitable cross-sectional shapes, such as oval, racetrack, ellipse, square, rectangular (non-square), hexagonal, octagonal, wedge or pie-shaped, triangular or tri-lobed, and the like.

Example Green Sintering Aid Methods

In various example embodiments, a fluid formulation, for example, provided as a slurry or a dissolved solution of a sintering aid, may be applied to a skin of a green honeycomb body. Thereafter, the green honeycomb body with the applied sintering aid is fired. Such method embodiments are referred to herein as green sintering aid methods. The fluid formulation prepared comprises a solvent such as, but not limited to, water. In certain embodiments, an acid, base, or dispersant may be provided in the solvent such that the sintering aid particles are suspended or partially or fully dissolved.

In various example embodiments, the fluid formulation may be applied to the green honeycomb body by painting on, by rolling the green honeycomb structure such as in a shallow pan containing the fluid formulation, by dipping (e.g., with ends sealed), by spraying on, or by any other suitable method of achieving a nominally-uniformly distributed coating to at least the skin of the green honeycomb body. In certain embodiments, the wall regions just beneath and directly adjacent to the skin of green honeycomb body may also receive an application of the fluid formulation. For example, as shown in FIG. 1E, the halo region 108 can receive a coating of the fluid formulation in addition to the skin 106. The green honeycomb body is then fired according to a firing cycle that produces a nominally crack-free ceramic honeycomb body having bulk properties (e.g., porosity and median pore size) within a predetermined range.

In one example embodiment, a fluid formulation comprising colloidal silica is used as the sintering aid. For example, in certain embodiments, a 40 wt. % silica suspension in $H_2O$ is prepared and used as the sintering aid. In this example, the colloidal silica 40 wt. % silica suspension in $H_2O$ (e.g., LUDOX® AS-40, from Sigma-Aldrich of St. Louis, Missouri, USA) is mixed with water in the ratio of 7:3 (LUDOX AS-40: $H_2O$). In alternative embodiments, the wt. % of silica in the solvent system can be in the range from 2 wt. % to 60 wt. % or even higher. The desired amount of silica can be based on the specific application, and can be dependent on the starting porosity of the honeycomb body, the skin and wall thickness, and the ceramic composition of the body. In certain embodiments, the wt. % of silica in the solvent system can be in the range from 20 wt. % to 40 wt. %, for example in a green body with a mix of aluminum titanate and cordierite precursor inorganic particulate materials. In other embodiments, for example when the green honeycomb body is formed of cordierite or cordierite precursor inorganic particulate materials, the silica in the solvent can be less, such as in the range of 2 wt. % to 20 wt. %. This fluid formulation can be painted on, sprayed on, rolled on, dipped in, or otherwise applied to the green honeycomb body to coat the skin 106 and possibly localized portions of the walls (e.g., walls 102B) directly adjacent to the skin 106, such as the halo region 108. In various embodiments, the extruded green log can be the green honeycomb body coated rather than the individual pieces cut from the log. That is, the coating process described herein can be applied to either green honeycomb bodies comprising the individual cut pieces or to green honeycomb bodies comprising the green honeycomb logs from which the individual cut pieces are formed.

When the fluid formulation is applied to the green honeycomb body, the green honeycomb body may be at room temperature or optionally at an elevated temperature greater than room temperature. For example, the green honeycomb structure may be heated in, for example, a dryer to above 50° C., or to even about 100° C. in certain embodiments, and then coated while hot, via painting on the fluid formulation or other suitable application method, upon its removal from the dryer. In certain embodiments, the applying the fluid formulation comprising the sintering aid to the green honeycomb body can occur before drying. In other embodiments, a plastic wrap or other suitable vapor barrier can be applied to the green honeycomb body after applying the coating but before drying. The vapor barrier is present during drying. Wrapping the green honeycomb body with a vapor barrier can prevent the sintering aid from moving inwardly in the skin as the green honeycomb body is dried. In certain embodiments, the method can comprise applying a second coating of the fluid formulation to the green honeycomb body after drying. The second coating can be useful for adding additional volume of the sintering aid to the skin of the green honeycomb body. The method can comprise drying the green honeycomb body subsequent to applying the second coating of the fluid formulation. Thereafter, the coated honeycomb body is subjected to a firing in a conventional furnace for a time from about 10 hours to about 30 hours at a top soak temperature of between 1,330° C. and 1,430° C.

In certain embodiments, the ends 105A, 105B and thus channels 104 of the green honeycomb structure are blocked prior to coating. Blocking may be accomplished by any suitable mask. In this way, the fluid formulation is substantially, or even entirely, prevented from coating interior portions 112 of the green honeycomb structure.

In various embodiments, the green honeycomb body comprising a honeycomb structure with a matrix of intersecting walls 102, a skin 106 disposed around the periphery of the matrix, and a coating of the fluid formulation comprising a sintering aid on the skin 106, may be loaded into a furnace. No special apparatus or furnace designs are needed to implement various embodiments described herein.

Figure 2A:
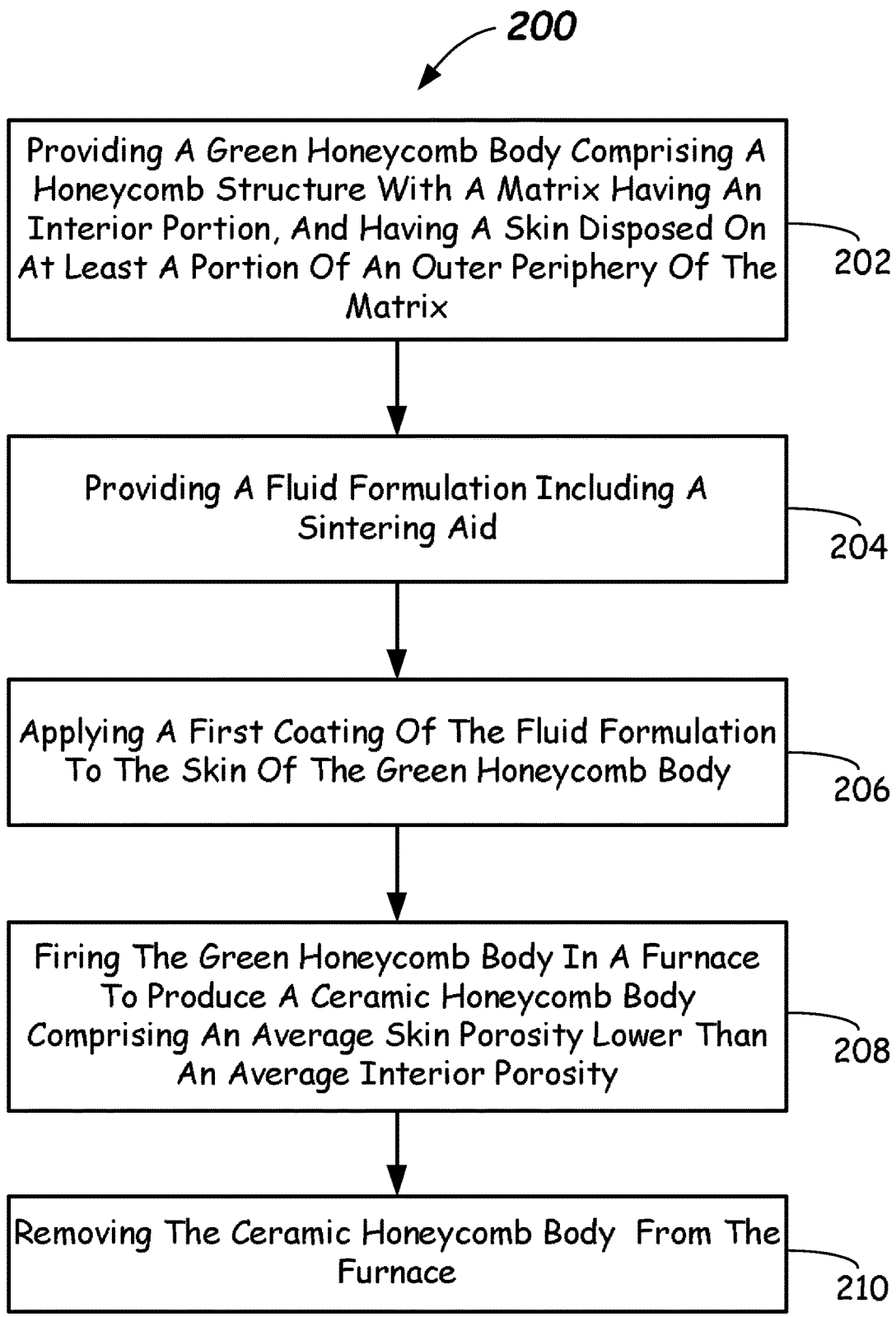
FIG. 2A illustrates a flowchart of an example method of manufacturing a ceramic honeycomb body having an outer portion with a first average porosity, and an interior portion with a second average porosity that is greater than the first average porosity in accordance with this disclosure.

In one illustrative example of the Green Sintering Aid Method of manufacturing a honeycomb body, and with reference to FIG. 2A, the method 200 comprises providing, in step 202, a green honeycomb body comprising a honeycomb structure with a matrix of intersecting walls (e.g., walls 102) having an interior portion (e.g., interior portion 112), and having a skin (e.g., skin 106) disposed on at least a portion of an outer periphery of the matrix. The method 200 further comprises, in step 204, providing a fluid formulation including a sintering aid, and, in step 206, applying a coating of the fluid formulation to the skin (e.g., skin 106) of the green honeycomb body. The fluid formulation can be provided by preparing as described herein.

The method 200 further comprises, in step 208, firing the green honeycomb body after applying the coating to provide a ceramic honeycomb body (e.g., ceramic honeycomb body 100, 110) having an interior portion (e.g., interior portion 112) and a skin (e.g., skin 106) disposed on at least a portion of the outer periphery of the matrix. The skin (e.g., skin 106) of the ceramic honeycomb body (e.g., ceramic honeycomb body 100, 110) can comprise a first average porosity, and the interior portion (e.g., interior portion 112) of the matrix of the ceramic honeycomb body (e.g., ceramic honeycomb body 100, 110) can comprise a second average porosity, wherein the first average porosity is less than the second average porosity. After firing, in step 210, the ceramic honeycomb body (e.g., ceramic honeycomb body 100, 110) is removed from the furnace. As a result, the first average porosity can be less than the second average porosity by 1 vol. % or more, 2 vol. % or more, 3 vol. % or more, and 4 vol. % or more in certain embodiments, and ranging from 1 vol. % to 5 vol. % in certain embodiments.

Figure 2B:
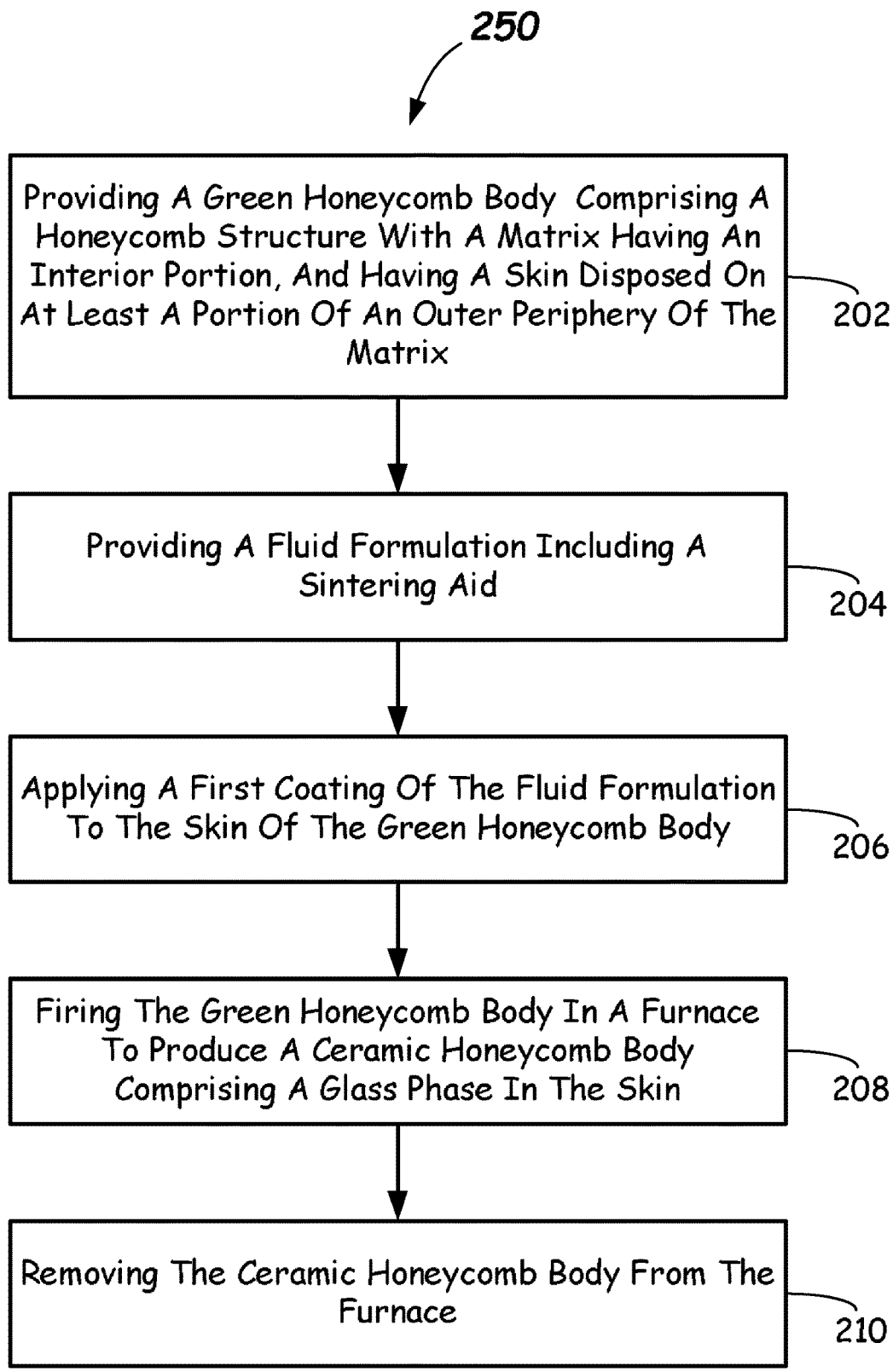
FIG. 2B illustrates a flowchart of an example method of manufacturing a ceramic honeycomb body having a glass phase in the skin in accordance with this disclosure.

In another illustrative example of the Green Sintering Aid Method of manufacturing a honeycomb body, and with reference to FIG. 2B, the method 250 comprises providing, in step 202, a green honeycomb body comprising a honeycomb structure with a matrix of intersecting walls (e.g., walls 102) having an interior portion (e.g., interior portion 112) and having a skin (e.g., skin 106) disposed on at least a portion of an outer periphery of the matrix. The method 250 further comprises, in step 204, providing a fluid formulation including a sintering aid, and, in step 206, applying a coating of the fluid formulation to the skin (e.g., skin 106) of the green honeycomb body. The method 250, further comprises, in step 208, firing the green honeycomb body after applying the coating to provide a ceramic honeycomb body (e.g., ceramic honeycomb body 100, 110) having an interior portion (e.g., interior portion 112) and having a skin (e.g., skin 106) disposed on at least a portion of the outer periphery of the matrix, wherein the ceramic honeycomb body comprises a glass phase (see glass phase 514 in FIG. 5) formed in the skin (e.g., skin 106). In certain embodiments, the glass phase 514 comprises a glass layer formed within a defined region of the skin. In other embodiments, a glass phase can be provided in walls directly adjacent to the skin, such as in a halo region 108. According to the method 250, after firing, the ceramic honeycomb body (e.g., ceramic honeycomb body) is removed from the furnace in step 210.

The firing cycle in the Green Sintering Aid Methods of manufacturing a honeycomb body can be any suitable firing cycle used for developing the desired phase composition of the ceramic honeycomb body 100, 110 (e.g., in the interior portion 112). For example, the firing cycle of the furnace can include a peak hold between about 1,330° C. and 1,430° C. for a time ranging from about 10 hours to about 30 hours. Other suitable firing cycles for the ceramic composition intended to be formed can be used.

Figure 9:
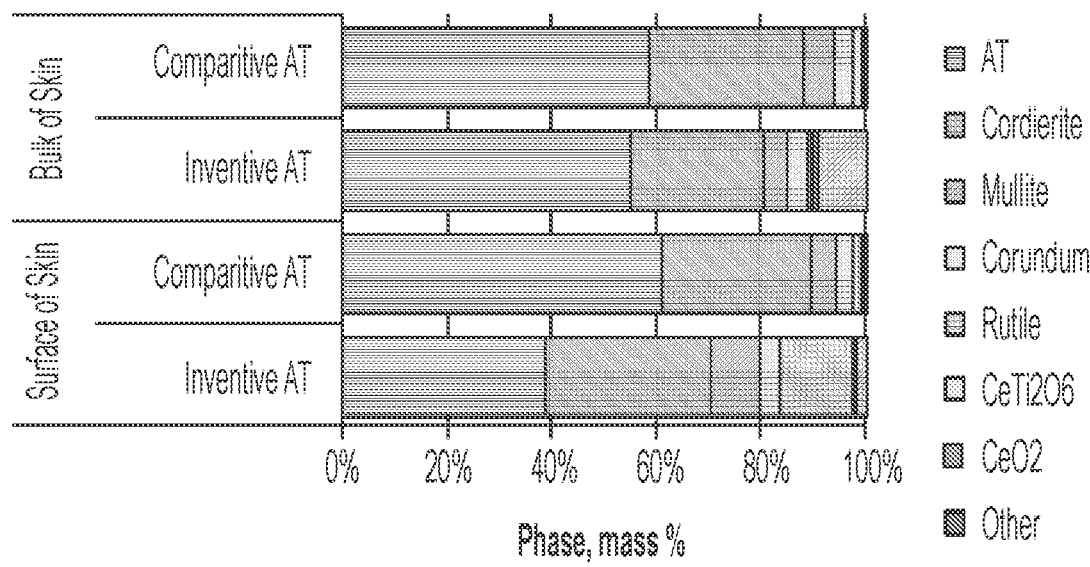
FIG. 9 illustrates bulk and surface phase compositions (mass %) of a ceramic honeycomb body prepared with an application of a skin coating comprising a sintering aid and also without application of a skin coating comprising a sintering aid in accordance with this disclosure.

FIG. 9 illustrates the phase mass (in mass %) of the various phases of solid in the bulk of the skin 106 of a ceramic honeycomb body 100, 110 including the skin coating as compared to a similar ceramic honeycomb body (AT) not including the skin coating. The material was a high porosity (approx. 59% porosity) aluminum-titanate containing formulation. Similarly, the phase mass of the various phases (in mass %) of solid on the surface of the skin 106 of a ceramic honeycomb body 100, 110 including the skin coating as compared to a similar ceramic honeycomb body not including the skin coating are shown.

Figures 10, 11:
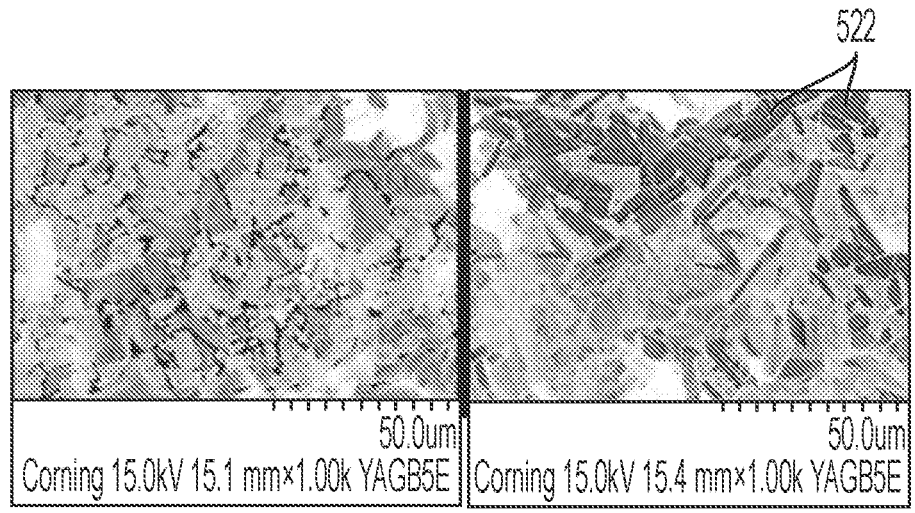
FIG. 10 illustrates micrographs of a portion of the skin surface of a ceramic honeycomb body prepared with an application of a skin coating comprising a sintering aid (FIG. 11) and also without application of a skin coating comprising a sintering aid (FIG. 10) in accordance with this disclosure.

FIGS. 10 and 11 illustrate surface micrographs of a skin surface of a ceramic honeycomb body 100, 110 including the skin coating (FIG. 11) as compared to a similar ceramic honeycomb body not including the skin coating (FIG. 10). As can be seen, substantially more rutile phase mass 522 is present on the skin surface 516 of the honeycomb body 100 including the skin coating than the embodiment that was not coated (FIG. 10). Moreover, substantially less AT phase mass is present on the surface of the skin 106 of the honeycomb body 100 including the skin coating than the honeycomb body that was not coated. Further, substantially less $CeTi_2O_6$ phase mass (substantially zero) is present on the surface of the skin 106 of the honeycomb body 100 including the skin coating than the honeycomb body that was not coated.

Example Fired Sintering Aid Method

In various example embodiments, the fluid formulation, for example, a slurry or a dissolved solution of a sintering aid, may be applied to a ceramic honeycomb body (as opposed to a green honeycomb body), such as to the skin 106 thereof, and the ceramic honeycomb body with the applied sintering aid is subject to a second firing. Such embodiments are referred to herein as "fired sintering aid methods."

In various example embodiments, the fluid formulation may be applied to the ceramic honeycomb body by painting on, by rolling the ceramic honeycomb body in a shallow pan of the fluid formulation, by dipping the ceramic honeycomb body in a vat of the fluid formulation, by spraying on, or by any other suitable method of achieving a nominally-uniformly distributed coating on at least the skin of the ceramic honeycomb body 100, 110. In certain embodiments, the walls 102 just beneath the skin 106 of ceramic honeycomb body 100, 110 may also receive an application of the fluid formulation. For example, the walls 102 of a first few cells (e.g., 1-3 cells) directly adjacent to the skin 106 may receive the formulation. In certain embodiments, the halo region 108 can have the formulation applied thereto along with the skin 106, for example.

The ceramic honeycomb body is then re-fired according to a firing cycle that produces a nominally crack-free ceramic honeycomb body. In one example embodiment, the coated ceramic honeycomb body 100, 110 is held in a furnace at a peak temperature of about 1,200° C. to 1,450° C. (e.g., about 1,355° C.) for a time ranging from about 0.5 hours to four hours in certain embodiments. Other suitable firing cycles may be used based on the temperature of the ceramic honeycomb body's initial firing cycle. Because the ceramic honeycomb body was previously fired in this example, use of precision temperature control may be avoided.

In one illustrative example embodiment, colloidal silica comprising 40 wt. % silica suspensions in $H_2O$ can be used as a sintering aid. In this example, the colloidal silica comprising 40 wt. % silica suspension in $H_2O$ (e.g., LUDOX® AS-40, from Sigma-Aldrich of St. Louis, Missouri, USA) is mixed with water in the ratio of 7:3. In alternative embodiments, the wt. % of silica in the suspension can be in the range from 5 wt. % to 75 wt. % or even higher. This fluid formulation can be painted on, sprayed on, rolled on, dipped in, or otherwise applied to the ceramic honeycomb body. When the fluid formulation is applied to the ceramic honeycomb body, the ceramic honeycomb body may be at room temperature or at a temperature greater than room temperature. For example, the ceramic honeycomb body may be heated in, for example, a dryer to above 50° C. (e.g., about 100° C.) and subsequently coated hot, via painting or other suitable application method, promptly upon its removal from the dryer. In certain embodiments, the ends of the ceramic honeycomb body can be blocked (masked) prior to coating. In this way, the fluid formulation is substantially or even entirely prevented from coating interior portions of the ceramic honeycomb body.

In various embodiments, ceramic honeycomb body comprising a honeycomb structure with the matrix of intersecting walls 102, a skin 106 disposed around the periphery of the matrix, and a coating of the fluid formulation including a sintering aid on skin 106, may be loaded into a furnace. No special furnace design is needed to implement various embodiments in accordance with this disclosure. "Furnace" as used herein means any kiln, tunnel kiln, heated container or chamber, or other heating apparatus or device configured to sinter honeycomb bodies and form ceramic honeycomb bodies.

Figure 3:
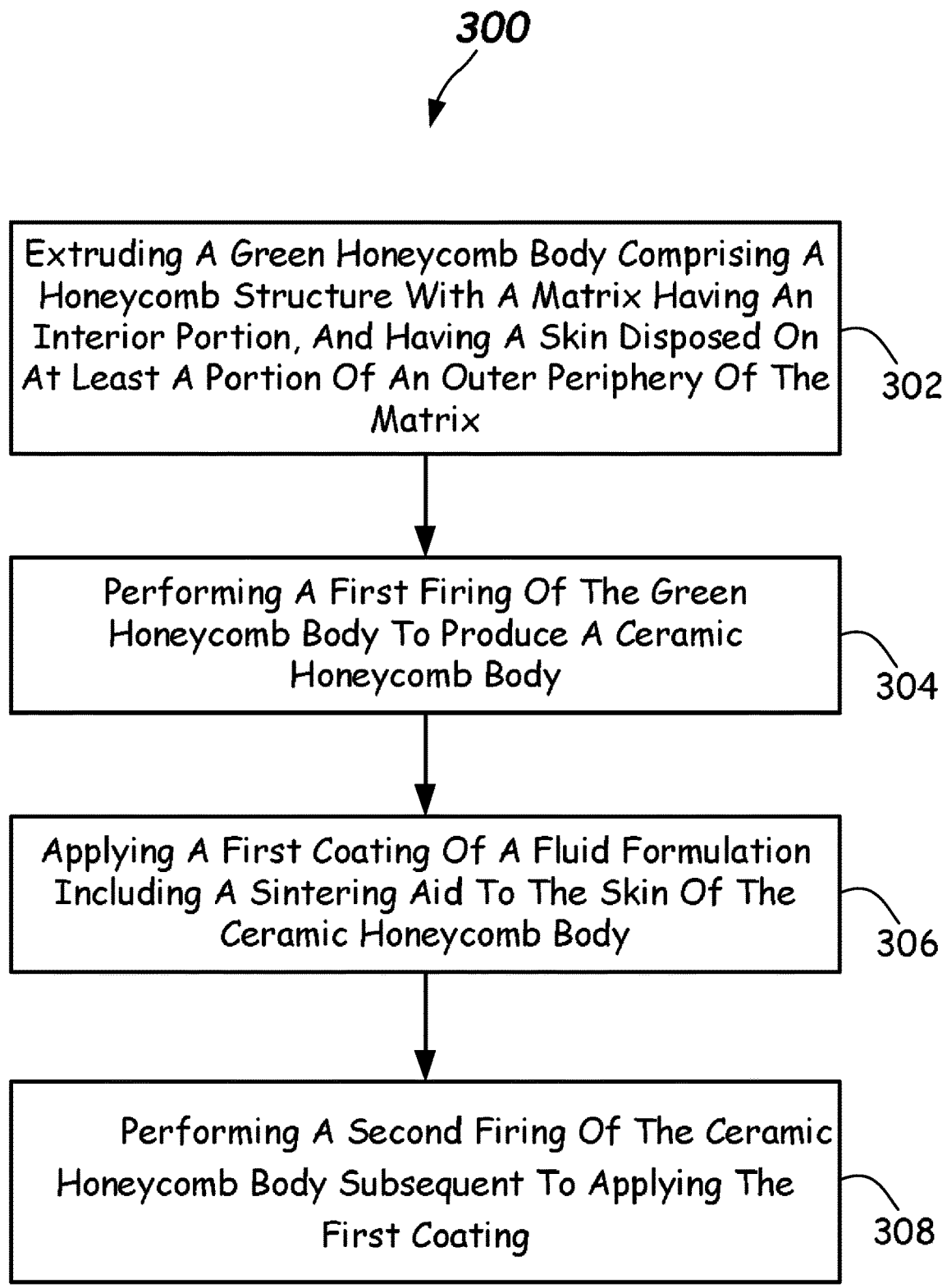
FIG. 3 illustrates a flowchart of an alternative example method of manufacturing a ceramic honeycomb body having an outer portion with a first average porosity, and an inner portion with a second average porosity that is greater than the first average porosity in accordance with this disclosure.

In one illustrative example of the Fired Sintering Aid method of manufacturing a ceramic honeycomb body, and with reference to FIG. 3, the method 300 includes extruding, in step 302, a green honeycomb body, the green honeycomb body comprising a honeycomb structure with a matrix of intersecting walls (e.g., walls 102), and a skin (e.g., skin 106) disposed adjacent to an outer periphery of the matrix. The method 300 comprises, in step 304, performing a first firing of the green honeycomb body to produce a ceramic honeycomb body, followed by, in step 306, applying a first coating of a fluid formulation including a sintering aid to the skin of the ceramic honeycomb body. This is followed by a second firing (re-firing) of the ceramic honeycomb body subsequent to applying the first coating in in step 308.

In certain embodiments of the method 300, the sintering aid comprises particles of a material exhibiting a median particle size ($D_{50}$) of less than or equal to 5.0 micrometers, less than about 2.0 micrometers, or even less than about 1.0 micrometer in certain embodiments, and preferably very small particles having a median particle size from 0.01 micrometers to 1.0 micrometers. The material of the sintering aid is selected from a group consisting of a silica source, a sodium source, a calcium source, a boron source, an alumina source, a phosphorus source, a yttrium source, cerium oxide, silicon oxide, rare earth compounds, and various combinations of the foregoing. Oxides or salts of potassium, magnesium, strontium, barium, lithium, and various salts of transition metal elements (e.g., iron chloride), may also be used.

In other example embodiments for both green and ceramic honeycomb bodies, the sintering aid can be fully dissolved in the solvent system. Furthermore, in certain embodiments, and may be as small as, but not limited to, a median particle size ($D_{50}$) of about 10 nm. In still other example embodiments used for application to both green and ceramic honeycomb structures, the sintering aid can comprise suspended particles exhibiting a median particle size $D_{50}$ ranging from about 10 nm to 5.0 micrometers, or ranging from about 10 nm to 1.0 micrometers in certain embodiments.

In some example embodiments, the second firing cycle comprises, after coating the ceramic honeycomb body with the fluid formulation that includes a sintering aid, placing the ceramic honeycomb structure in a furnace, and holding the ceramic honeycomb body in the furnace at a peak temperature of between about 1,200° C. and about 1,450° C. from about 0.5 hours to about 4 hours, or even from 0.5 hours to 2 hours. In certain embodiments, after coating the ceramic honeycomb body with the fluid formulation that includes a sintering aid, but before placing the coated ceramic honeycomb structure in the furnace, the coated ceramic honeycomb structure is dried. In other embodiments, the coated ceramic honeycomb body is not dried before being placed in the furnace.

Figure 13:
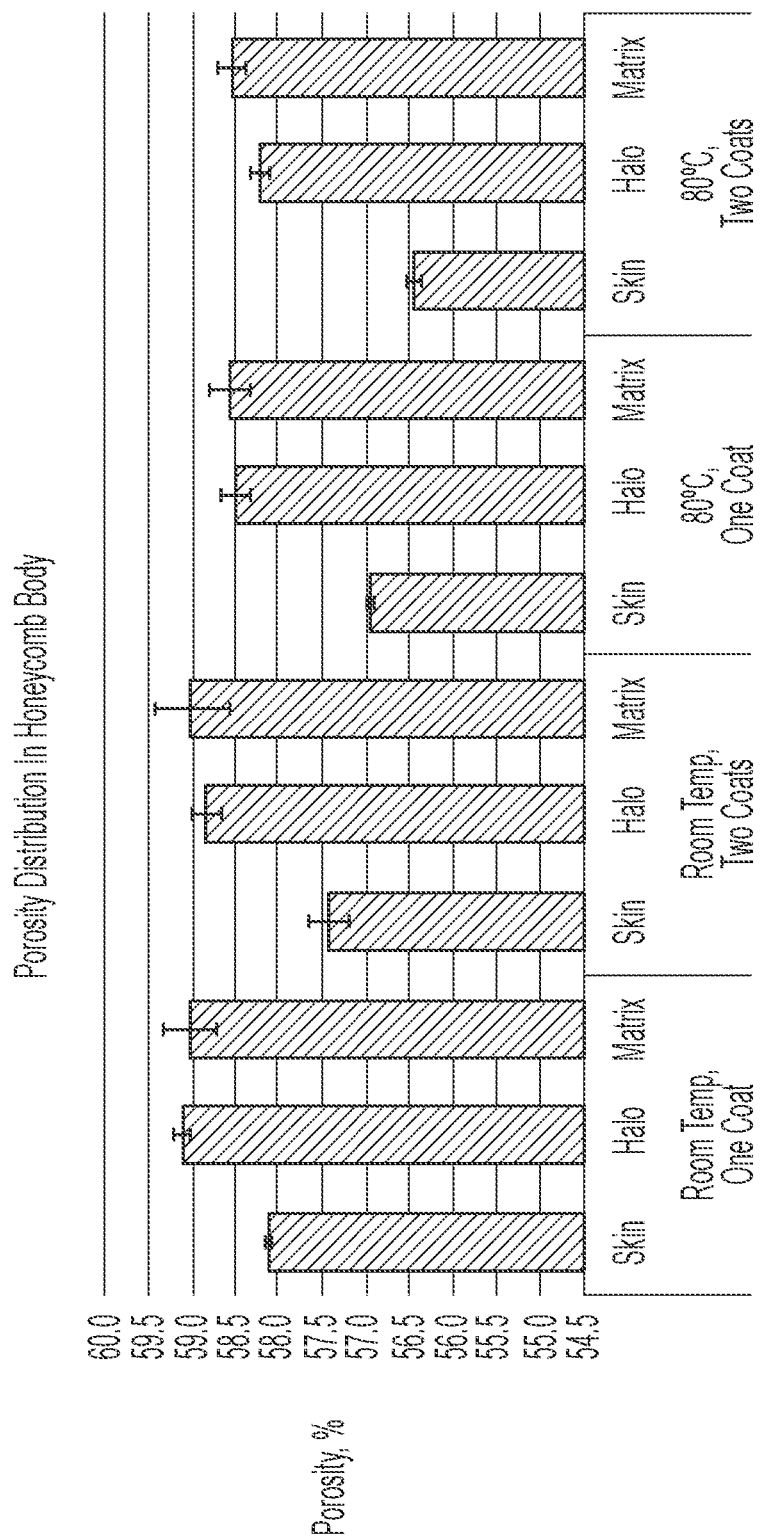
FIG. 13 illustrates a plot of porosity (%) of various portions (skin, halo, matrix) of a ceramic honeycomb body prepared with various applications (one coat, two coats, room temperature, and hot coated) of a skin coating (s) comprising a sintering aid in accordance with this disclosure.

FIG. 13 illustrates the effects of single coat of the fluid formulation, two coats of the fluid formulation, and of hot application of the fluid formulation comprising a sintering aid on the reduced porosity. As can be seen, multiple coat application of the fluid formulation comprising a sintering aid can be used to further lower the porosity of the skin 106 as compared to single coat application. Similarly, hot coating application of the fluid formulation comprising a sintering aid can be used to further lower the porosity of the skin 106 as compared to non-heated application.

Example Ceramic Honeycomb Bodies

As described above with respect to various embodiments, in order to increase the strength of a high-porosity (P %>40%, or even P %>50%, or even P %>55%) of honeycomb body 100, 110, a fluid formulation including a sintering aid is applied to a green honeycomb body, and the coated green honeycomb body is then fired. In some example embodiments, the fired ceramic honeycomb body 100 thus produced is an aluminum-titanate containing honeycomb body and contains a phase composition of about 62% aluminum titanate/magnesium titanate, about 29% cordierite, and a balance of other phases (including possibly such as, for example, mullite, alumina, corundum, and other minor phases). The inventors have found that, in certain embodiments, the skin 106 lost a smaller amount of porosity than expected. However even given that finding, the strength of the post-fired coated honeycomb body 100 was found to be quite high, as indicated by a 25%-40% increase in ISO strength of the ceramic honeycomb body 100. And this increased ISO strength did not reduce the ability of the ceramic honeycomb body 100 made in accordance with the present disclosure to pass thermal shock testing. Moreover, thermal shock testing results indicate that the coefficient of thermal expansion also did not suffer appreciably as a result of the coating and firing methods described above.

Figure 5:
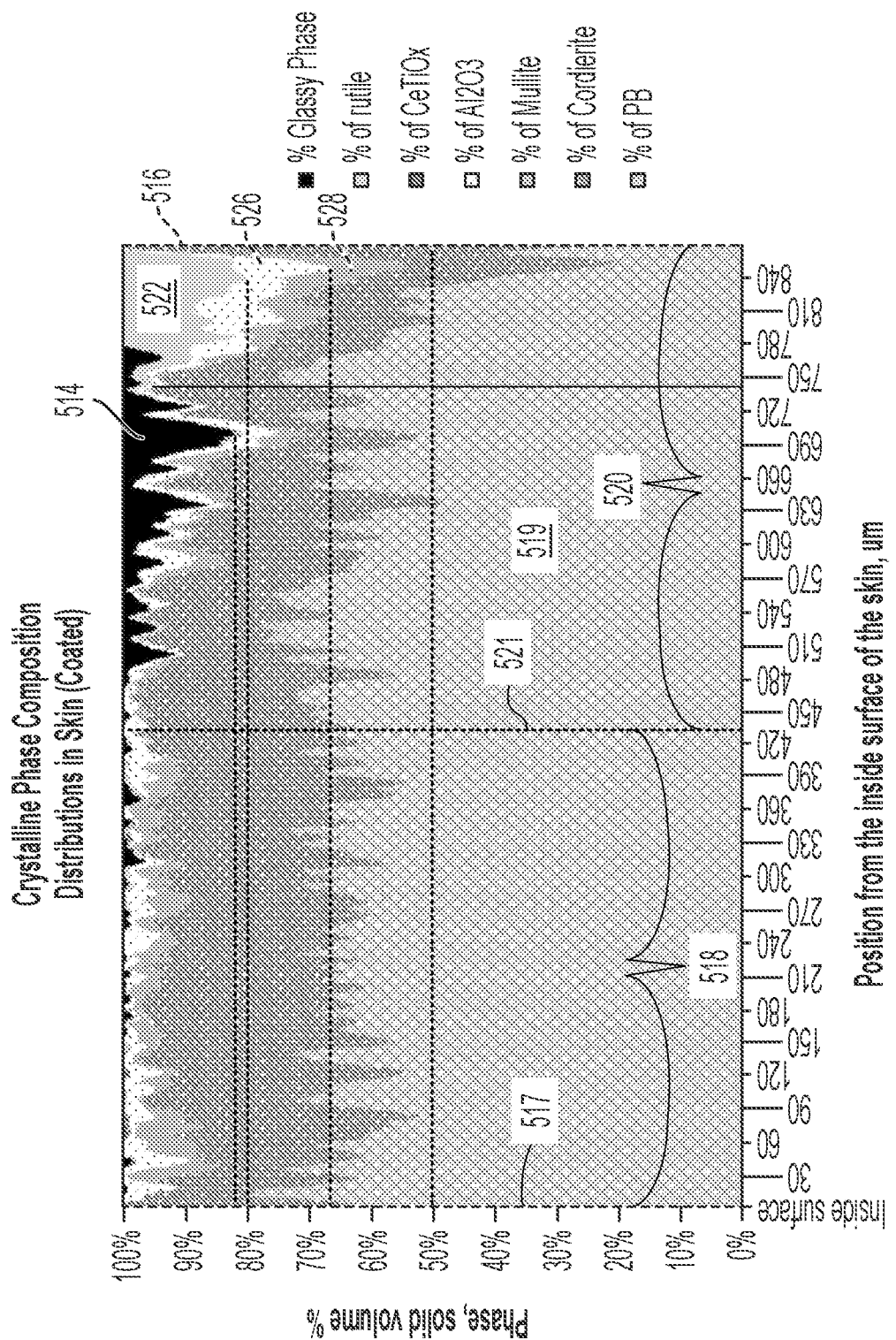
FIG. 5 illustrates a phase distribution diagram of a skin of a ceramic honeycomb body prepared with an application of a skin coating comprising a sintering aid in accordance with this disclosure.
Figure 6:
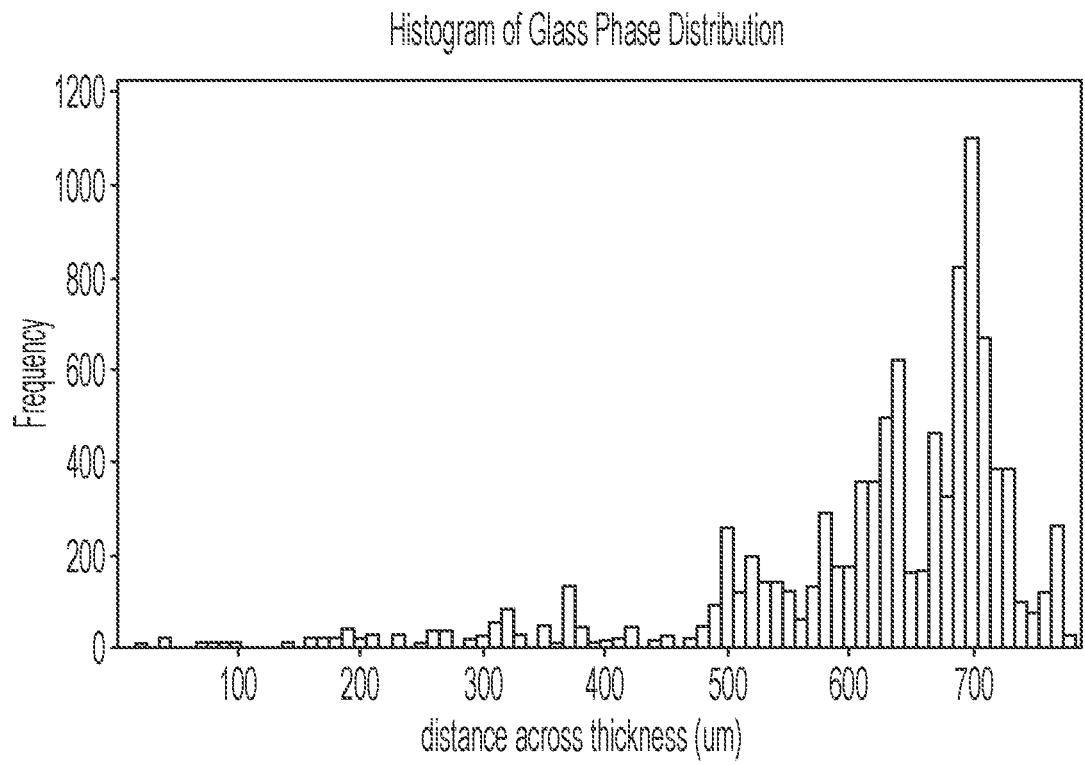
FIG. 6 illustrates a histogram plot of frequency of a glass phase in the skin as a function of distance across the skin thickness of a ceramic honeycomb body prepared with an application of a skin coating comprising a sintering aid in accordance with this disclosure.

Referring to FIG. 5, analysis of an outer surface 516 and the bulk internal portions (inner portion 518 and outer portion 520) of the skin 106 of ceramic honeycomb bodies 100, 110 manufactured in accordance with the present disclosure show the presence of a glass phase 514 in and on the skin 106. Furthermore, the skin 106 comprises a high rutile phase 522, particularly in an outer portion 520 adjacent to the outer surface 516. See also FIG. 6 and FIG. 7 which show histogram plots of the phase distributions of the glass phase (FIG. 6) and of the rutile phase (FIG. 7) in the skin 106 as a function of distance across the thickness of the skin 106.

Figure 4:
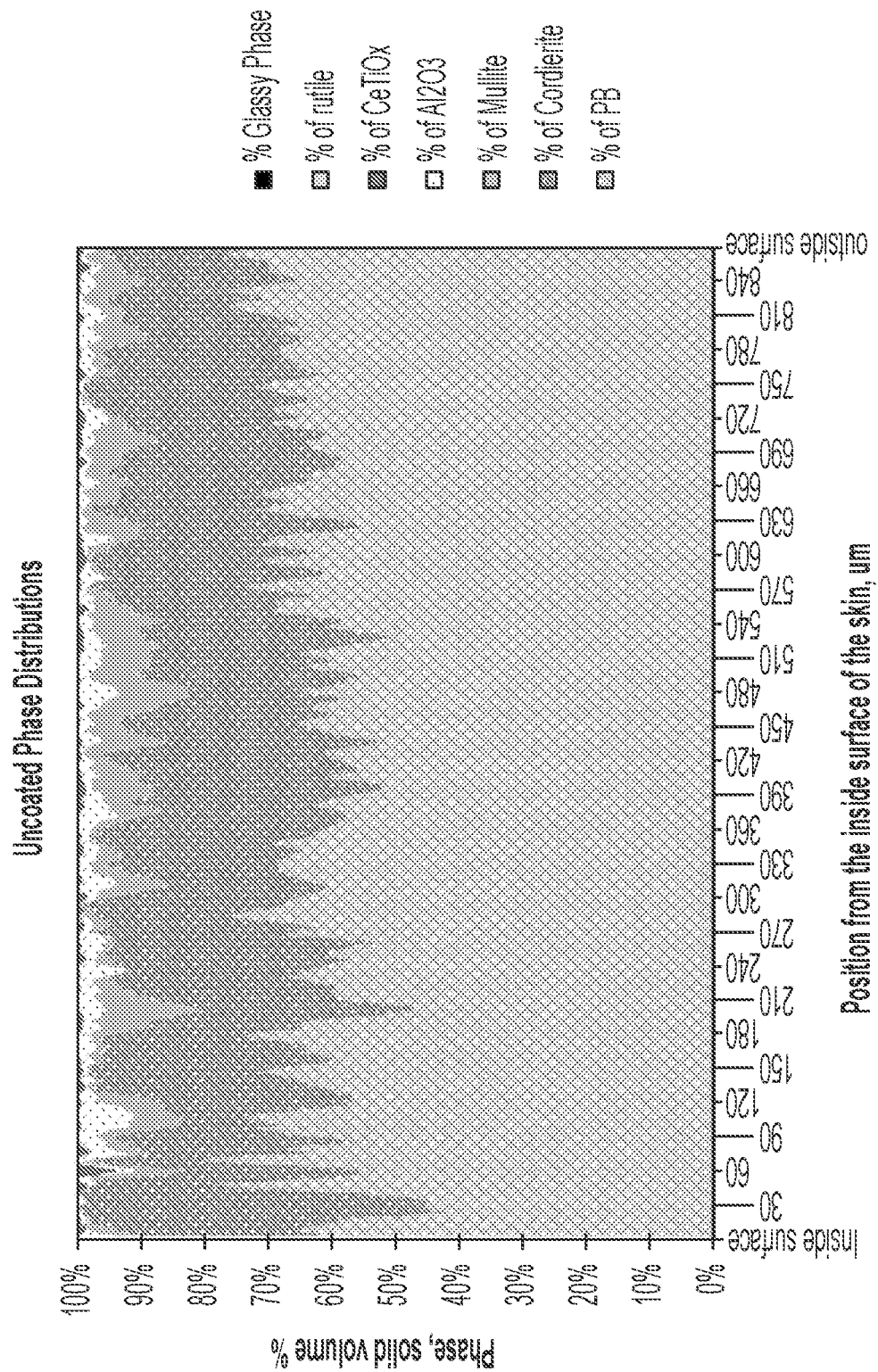
FIG. 4 illustrates a phase distribution diagram of a skin of a known ceramic honeycomb body prepared without an application of a skin coating comprising a sintering aid.

As can be seen from FIG. 4, which is a ceramic honeycomb body having the same batch formulation as the embodiment of FIG. 5, but that was not coated with a formulation comprising a sintering aid. A comparison of FIG. 4 and FIG. 5 illustrates that the bulk portion of the skin 106 includes a different phase composition than conventional skin. The inventors further discovered that the skin 106 containing the glass phase 514 can be formed as a glass-containing layer in the skin 106. The glass-containing layer comprising the glass phase 514 can extend to some extent through most of the skin 106, but in example embodiments shown (e.g., FIG. 5) can be concentrated in the outer portion 520 of the skin 106. For example, as shown, a large percentage (e.g., greater than 75 vol. %) of the glass phase 514 resides between 470 μm and 780 μm from the inner surface 517 of the skin 106. Peak values of the glass phase 514 comprise between 1% and about 20% or higher of the solid volume (excluding porosity) of the skin 106.

Thus, the glass phase 514 is present, in the depicted embodiment, predominantly in the outer portion 520 of the skin 106, i.e., in an outer 400 μm of the skin 106 having an 870 μm thickness. It is believed that this glass phase 514 is at least partially the reason for the higher strength of the ceramic honeycomb bodies 100, 110 prepared with the coatings comprising a sintering aid as described herein. That is, the glass phase 514 may provide a stiffer envelope around the ceramic honeycomb body 100, 110, as compared to ceramic honeycomb bodies prepared without the coating methods described herein. Further, the presence of the glass phase 514 in the skin does not introduce any appreciable thermal expansion issues, i.e., mismatches in the coefficient of thermal expansion.

The volume percentage of glass phase 514, which is an amorphous, non-crystalline phase in the skin 106 was determined by a combination of electron back scattering diffraction (EBSD) and Energy Dispersive Spectroscopy (EDS). Image analysis was used to extract phase variations across the thickness of the skin 106 from EBSD maps. The silica glass phase distribution was extracted from SEM-EDS maps. Then using ImageJ and Matlab, images were processed and data collected as follows. EDS was used to find the phases that contain silica, which includes cordierite, mullite, and glass. To separate the glass phase from the cordierite and mullite, intensities were analyzed. The highest intensity areas were identified as glass phase. This was verified by comparing the EBSD maps. EBSD shows only the crystalline phases of the material. As an amorphous glass, the glass phase does not show up in the EBSD plots. This allowed verification that the high-intensity silica phase and the solid amorphous phase were indeed the same, and therefore the glass phase. Plots shown in FIGS. 4 and 5 are stacked distributions of the phases from the inside surface 517 of the skin 106 to the outside surface 516 of the skin 106. FIGS. 4 and 5 do not include porosity and thus plot only solid phase volume percentages.

In more detail, FIGS. 4 and 5 illustrate, respectively, phase distributions for the skin 106 of a known first ceramic honeycomb body prepared without a coating comprising sintering aid as described herein, and the skin 106 of a second ceramic honeycomb body 100 prepared with the coating comprising sintering aid as described herein. Table 1 below illustrates average vol. % of the particular phases present in the skin 106 of the uncoated first skin and fired skins 106 according to embodiments of the disclosure.

TABLE 1

Average Volume Phase Percentages

| Phase | Avg. Vol. % solid (Uncoated) | Avg. Vol. % solid (Coated) |
|---|---|---|
| Pseudobrookite (PB) | 63.8% | 63.8% |
| CeTi$_2$O$_6$ (Cerium Titanate) | 0.7% | 0.1% |
| Al$_2$O$_3$ (Corundum) | 2.1% | 3.1% |
| Cordierite | 28.7% | 25.9% |
| Mullite | 4.7% | 3.0% |
| TiO$_2$ (rutile) | 0.0% | 1.6% |
| Glass Phase | 0.0% | 2.6% |
| Total Solid | 100% | 100% |

Various embodiments of this disclosure provide ceramic honeycomb bodies 100, 110 with increased ISO strength as compared to similar but uncoated ceramic honeycomb bodies. There are similar accrued advantages for aluminum-titanate-containing honeycomb bodies as well as cordierite-containing honeycomb bodies. As described below, various ceramic honeycomb bodies 100, 110 obtained in accordance with the methods disclosed herein may have increased amounts of a glass phase 514 in the skin 106 and on the skin surface 516 thereof, as well as increased amounts of a rutile phase (crystalline titania) 522 in the skin 106 and on the skin surface 516, as compared to similar but uncoated ceramic honeycomb bodies.

FIG. 4 shows the uncoated ceramic honeycomb body to have no glass phase present in the skin as compared to the coated ceramic honeycomb body phase distribution shown in FIG. 5 that includes a glass phase 514 in the skin 106.

Comparing FIGS. 4 and 5, it is further demonstrated that both the amount and the distribution of the glass phase 514 are significantly different than that of the uncoated ceramic honeycomb body that contains essentially no glass phase. For example, as shown in FIG. 5, an outer portion 520 of the skin 106 of the ceramic honeycomb body 100, 110 located from about mid thickness 521 to the outer surface 516 of the skin 106 contains a majority percentage (greater than 50 vol. %) of the glass phase 514. The glass phase 514 is this example is in an amount from a peak % of about 1% to a peak % of about 20%.

Again with reference to FIGS. 1A-1E and FIG. 5, in some example embodiments in accordance with this disclosure, a ceramic honeycomb body 100, 110 is provided comprising a honeycomb structure with a matrix of intersecting walls 102, and a skin 106 disposed at an outer periphery of the matrix. The skin 106 comprises an inner portion 518 and an outer portion 520, and a glass phase 514 distributed within the skin 106. The glass phase 514 can be provided, for example, in an average concentration ranging from 0.5% vol. % to 5 vol. %, or even higher. The glass phase 514 can also be disposed on at least a portion of the outer surface 516 of the skin 106. In some example embodiments the skin has a thickness ranging from 500 µm to 2,000 µm, and about 870 µm in certain embodiments.

Further, FIG. 4 shows the uncoated ceramic honeycomb structure to have a substantially uniform distribution of rutile (i.e., crystalline titania), whereas FIG. 5 shows the coated ceramic honeycomb structure to have a rutile phase 522 concentrated from about 740 µm from the inner surface 517 of the skin 106 to the outer surface 516 of the skin 106. The crystalline titania can be large-faceted.

Figure 7:
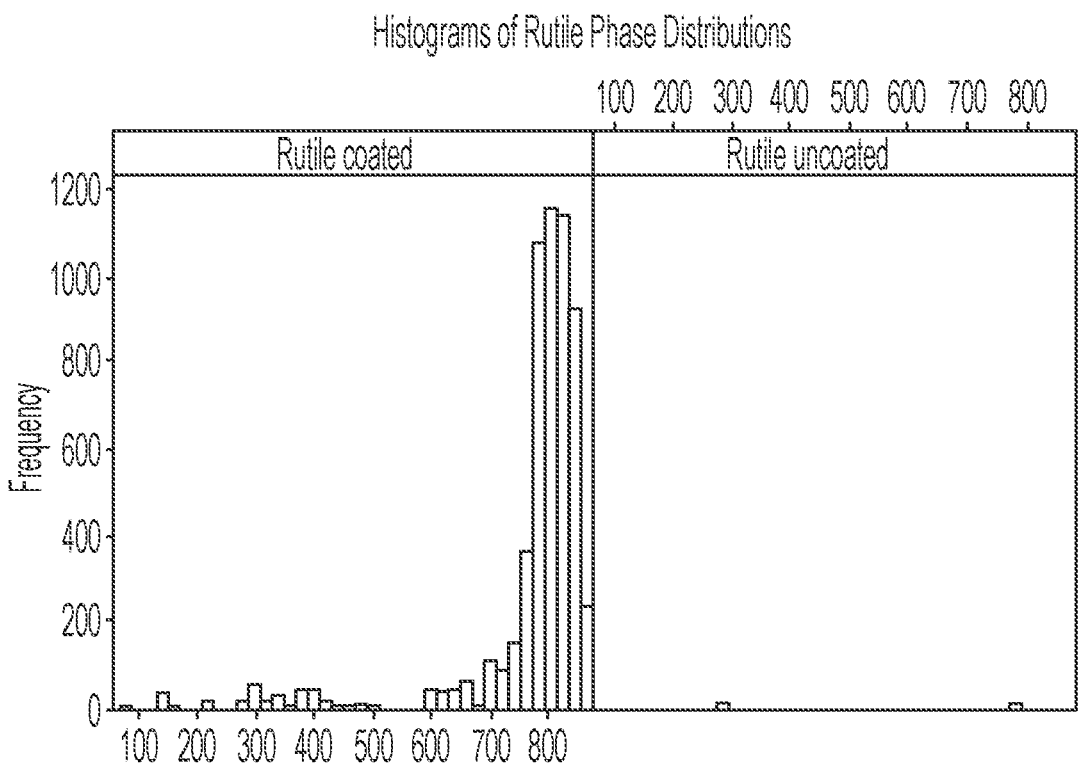
FIG. 7 illustrates a histogram plot of frequency of a rutile phase in the skin as a function of distance across the skin thickness of a ceramic honeycomb body prepared with an application of a skin coating comprising a sintering aid and also without application of a skin coating comprising a sintering aid in accordance with this disclosure.

As further shown in FIGS. 5 and 7, in some example embodiments in accordance with this disclosure, a ceramic honeycomb body 100 is provided with differing amounts of crystalline titania phase 522 (e.g., Rutile) provided throughout radial thickness of the skin 106. In particular, more crystalline titania phase 522 (in vol. %) is provided at or near the outer surface 516 of the skin 106 as compared to at or near the inner surface 517 of the skin 106.

In more detail, the ceramic honeycomb body 100 comprises a honeycomb structure with a matrix of intersecting walls 102, and a skin 106 disposed at an outer periphery of the matrix and extending radially and circumferentially from the inner surface 517 to the outer surface 516. The skin 106 further comprises an inner portion 518 and an outer portion 520, and a first amount of a crystalline titania phase 522 of a first average volume percentage (vol. %) distributed in the outer portion 520 of the skin 106, and a second average amount of crystalline titania 522 distributed in a second average volume percentage (vol. %) within the inner portion 518 of the skin 106, wherein the second average volume percentage is less than the first average volume percentage. For example, the second peak volume percentage (vol. %) within the inner portion 518 can be less than the second peak volume percentage (vol. %) within the outer portion 520 by at least 5%, at least 10%, or even at least 15%, and ranging from 1% to 15% or even more. In some example embodiments the skin 106 has a thickness ranging from 500 µm to 2,000 µm, and about 870 µm in certain embodiments.

In some example embodiments in accordance with this disclosure, a ceramic honeycomb body 100, 110 is provided having a matrix of intersecting walls 102, and a skin 106 disposed at an outer periphery of the matrix. The skin 106 can comprise greater than 50 vol. % aluminum titanate (pseudobrookite phase 519) on average. Note that in FIGS. 4 and 5, "PB" refers to a pseudobrookite phase 519.

FIG. 5 further illustrates that in the outer portion 520 of the skin 106 and the inner portion 520 of the skin surface 520 comprise a different phase makeup and composition. In particular, when comparing a first half thickness of the skin 106 corresponding to the inner portion 518 from the inner surface 517 to the middle 521 to a second half thickness of the skin 106 corresponding to the outer portion 520 from the middle 521 to the outer surface 516, certain phases are more prevalent in the outer portion 520 according to embodiments of the disclosure.

For example, a vol. % of crystalline titania phase (Rutile) 522 is greater in terms of both average vol. % and peak vol. %. within the outer portion 520 than within the inner portion 518. Likewise, a vol. % of an alumina ($Al_2O_3$) phase 526 is greater in terms of both average vol. % and peak vol. % within the outer portion 520 than within the inner portion 518. Moreover, a vol. % of a mullite phase ($3Al_2O_3 2SiO_2$) 528 is greater in terms of both average vol. % and peak vol. %. within the outer portion 520 than within the inner portion 518.

Such embodiments provide ceramic honeycomb bodies 100, 110 having greater ISO strength than conventional ceramic honeycomb bodies. In further embodiments, the matrix of intersecting walls 102 can include a halo portion 108, i.e., a portion of the walls 102B directly adjacent to the skin 106 that are thicker than the remainder of walls located in an inner portion of the matrix. The halo portion 108 can be coated as well in certain embodiments and can include a glass phase therein which can further enhance strength.

The term "nominal" as used herein refers to a desired, or target, value of a characteristic, measurement, weight, or other parameter for a component, product, or process, together with a range of values above and/or below the desired value. The range of values is typically due to slight variations in manufacturing processes or tolerances.

Although the terms first, second, etc., may be used to describe various elements, components, regions, parts or sections, these elements, components, regions, parts or sections, should not be limited by these terms. The terms may be used to distinguish one element, component, region, part or section, from another element, component, region, part or section. For example, a first element, component, region, part or section discussed above could be termed a second element, component, region, part or section without departing from the teachings of the present disclosure.

While embodiments of this disclosure have been disclosed in example forms, many modifications, additions, and deletions can be made without departing from the scope of this disclosure, as set forth in the claims and their equivalents.

What is claimed is:

1. A ceramic honeycomb body, comprising:
   a honeycomb structure comprising a matrix of intersecting walls;
   a skin disposed adjacent to an outer periphery of the matrix of intersecting walls, wherein the skin comprises a glass phase distributed within the skin;
   wherein the skin has an inner portion and an outer portion, and wherein crystalline titania is distributed in the outer portion in a first average volume percentage and in the inner portion in a second average volume percentage, wherein the second average volume percentage is less than the first average volume percentage.

2. The ceramic honeycomb body of claim 1, wherein the glass phase comprises a peak percentage of 1 vol. % or more.

3. The ceramic honeycomb body of claim 1, wherein the glass phase comprises a peak percentage of 5 vol. % or more.

4. The ceramic honeycomb body of claim 1, wherein the glass phase comprises a peak percentage of 10 vol. % or more.

5. The ceramic honeycomb body of claim 1, wherein the glass phase comprises a peak percentage of 15 vol. % or more.

6. The ceramic honeycomb body of claim 1, wherein the glass phase comprises a peak percentage from 1 vol. % to 20 vol. %.

7. The ceramic honeycomb body of claim 1, wherein the glass phase in the skin comprises an average concentration ranging from 0.5% vol. % to 5 vol. %.

8. The ceramic honeycomb body of claim 1, wherein the skin comprises an inner portion and an outer portion, and the glass phase is distributed in the outer portion in first average volume percentage and in the inner portion in a second average volume percentage, wherein the second average volume percentage is less than the first average volume percentage.

9. The ceramic honeycomb body of claim 1 wherein the skin of the ceramic honeycomb body comprises a first average porosity, an interior portion of the matrix of the ceramic honeycomb body comprises a second average porosity, and the first average porosity is less than the second average porosity.

10. The ceramic honeycomb body of claim 1 wherein an amount of crystalline titania is distributed within the skin.

11. The ceramic honeycomb body of claim 10 wherein an outer surface of the skin comprises at least a portion of the glass phase and at least a portion of the crystalline titania.

12. The ceramic honeycomb body of claim 10 wherein at least a portion of the glass phase and at least a portion of the crystalline titania are disposed at or near an outer surface of the skin.

13. The ceramic honeycomb body of claim 10 wherein the glass phase and the crystalline titania are disposed in the skin and on a surface of the skin.

14. A ceramic honeycomb body, comprising:
   a honeycomb structure comprising a matrix of intersecting walls;
   a skin disposed adjacent to an outer periphery of the matrix of intersecting walls, wherein the skin has an inner portion and an outer portion, wherein the skin comprises a glass phase; and
   an amount of crystalline titania distributed within the skin, wherein the crystalline titania is distributed in the outer portion in a first average volume percentage and in the inner portion in a second average volume percentage, wherein the second average volume percentage is less than the first average volume percentage.

15. The ceramic honeycomb body of claim 14 wherein at least a portion of the glass phase and at least a portion of the crystalline titania are disposed at or near an outer surface of the skin.

16. The ceramic honeycomb body of claim 14 wherein an outer surface of the skin comprises at least a portion of the glass phase and at least a portion of the crystalline titania.

17. The ceramic honeycomb body of claim 14 wherein the glass phase and the crystalline titania are disposed in the skin and on a surface of the skin.

18. A ceramic honeycomb body, comprising:
a honeycomb structure comprising a matrix of intersecting walls;
a skin disposed adjacent to an outer periphery of the matrix of intersecting walls, wherein the skin has an inner portion and an outer portion, wherein the skin comprises a glass phase; and
an amount of crystalline titania distributed within the skin, wherein the crystalline titania is distributed in the outer portion in a first average volume percentage and in the inner portion in a second average volume percentage, wherein the second average volume percentage is less than the first average volume percentage;
wherein at least a portion of the glass phase and at least a portion of the crystalline titania are disposed at or near an outer surface of the skin.

19. A ceramic honeycomb body, comprising:
a honeycomb structure comprising a matrix of intersecting walls;
a skin disposed adjacent to an outer periphery of the matrix of intersecting walls, wherein the skin has an inner portion and an outer portion, wherein the skin comprises a glass phase; and
an amount of crystalline titania distributed within the skin, wherein the crystalline titania is distributed in the outer portion in a first average volume percentage and in the inner portion in a second average volume percentage, wherein the second average volume percentage is less than the first average volume percentage;
wherein an outer surface of the skin comprises at least a portion of the glass phase and at least a portion of the crystalline titania.

* * * * *